(12) United States Patent
Segota et al.

(10) Patent No.: US 7,296,411 B2
(45) Date of Patent: Nov. 20, 2007

(54) METHOD AND SYSTEM FOR REGULATING INTERNAL FLUID FLOW WITHIN AN ENCLOSED OR SEMI-ENCLOSED ENVIRONMENT

(75) Inventors: Darko Segota, 7432 S. Magic View Cir., Salt Lake City, UT (US) 84121; John W. Finnegan, II, Oakley, UT (US)

(73) Assignee: Darko Segota, Salt Lake City, UT (US)

( * ) Notice: Subject to any disclaimer, the term of this patent is extended or adjusted under 35 U.S.C. 154(b) by 0 days.

(21) Appl. No.: 10/600,208

(22) Filed: Jun. 19, 2003

(65) Prior Publication Data

US 2004/0050064 A1   Mar. 18, 2004

Related U.S. Application Data

(60) Provisional application No. 60/390,510, filed on Jun. 21, 2002.

(51) Int. Cl.
*F02K 1/00* (2006.01)
(52) U.S. Cl. .................................. 60/770; 239/265.11
(58) Field of Classification Search ........... 239/265.11, 239/265.19; 417/151, 163; 60/228, 229, 60/230, 231, 242, 226.1, 262, 770
See application file for complete search history.

(56) References Cited

U.S. PATENT DOCUMENTS

| | | | |
|---|---|---|---|
| 2,496,351 A * | 2/1950 | Mazzoni .................... 60/770 |
| 3,056,277 A | 10/1962 | Brenner ..................... 73/23 |
| 4,003,201 A * | 1/1977 | Lewis et al. ................ 60/262 |
| 4,171,785 A | 10/1979 | Isenberg .................... 244/123 |
| 4,228,943 A | 10/1980 | Tanabe et al. ............. 228/182 |
| 4,449,211 A | 5/1984 | Schmidt et al. ............. 367/153 |
| 4,619,423 A | 10/1986 | Holmes et al. ............. 244/130 |
| 4,668,443 A | 5/1987 | Rye ............................ 261/112 |
| 4,699,340 A | 10/1987 | Rethorst .................... 244/199 |
| 4,765,134 A * | 8/1988 | Brown et al. ................ 60/204 |
| 4,813,631 A | 3/1989 | Gratzer ....................... 244/35 |
| 4,851,071 A | 7/1989 | Gallimore .................. 156/344 |
| 4,872,484 A | 10/1989 | Hickey ................... 137/561 R |
| 4,974,633 A | 12/1990 | Hickey ................... 137/561 R |
| H001008 H * | 1/1992 | Schadow et al. ............. 60/737 |
| 5,133,519 A * | 7/1992 | Falco ......................... 244/200 |
| 5,144,099 A | 9/1992 | Cardy ......................... 174/66 |
| 5,316,032 A | 5/1994 | DeCoux ...................... 137/14 |
| 5,334,012 A * | 8/1994 | Brock et al. ................ 432/106 |

(Continued)

OTHER PUBLICATIONS

The Pocket Ramjet Reader, United Technologies Corporation 1978, p. 33.*

(Continued)

*Primary Examiner*—William H. Rodriguez
(74) *Attorney, Agent, or Firm*—Michael F. Krieger; Kirton & McConkie

(57) ABSTRACT

The present invention features a fluid flow regulator that functions to significantly influence fluid flow across the surface of an object, as well as to significantly effect the performance of the object subjected to the fluid. The fluid flow regulator comprises a pressure recovery drop that induces a sudden drop in pressure at an optimal pressure recovery point on said surface, such that a sub-atmospheric barrier is created that serves as a cushion between the molecules in the fluid and the molecules at the object's surface.

47 Claims, 10 Drawing Sheets

U.S. PATENT DOCUMENTS

| | | | | |
|---|---|---|---|---|
| 5,590,854 | A | | 1/1997 | Shatz .................... 244/206 |
| 5,664,415 | A | * | 9/1997 | Terrier .................... 60/204 |
| 5,718,539 | A | | 2/1998 | Segota .................... 406/61 |
| 5,810,249 | A | | 9/1998 | Nilsson .................... 239/2.2 |
| 5,826,424 | A | * | 10/1998 | Klees .................... 60/262 |
| 5,863,155 | A | | 1/1999 | Segota .................... 406/61 |
| 6,180,536 | B1 | | 1/2001 | Chong et al. ............ 438/745 |
| 6,202,304 | B1 | | 3/2001 | Shatz .................... 29/896.6 |
| 6,263,745 | B1 | | 7/2001 | Buchanan et al. ......... 73/865.5 |
| 6,336,319 | B1 | * | 1/2002 | Koshoffer .................... 60/770 |
| 6,357,307 | B2 | | 3/2002 | Buchanan et al. ......... 73/865.5 |
| 6,523,339 | B2 | * | 2/2003 | Hubbard .................... 60/226.1 |
| 6,904,755 | B2 | * | 6/2005 | Canfield et al. ............ 60/770 |
| 7,048,505 | B2 | * | 5/2006 | Segota et al. ............ 415/191 |
| 2001/0004835 | A1 | * | 6/2001 | Alkable et al. ............ 60/757 |
| 2001/0053817 | A1 | | 12/2001 | Anayama et al. ........... 525/107 |
| 2003/0005701 | A1 | * | 1/2003 | Bulman .................... 60/761 |
| 2003/0033798 | A1 | * | 2/2003 | Dickau .................... 60/226.1 |
| 2004/0104309 | A1 | * | 6/2004 | Segota et al. ............ 244/204 |
| 2005/0098685 | A1 | * | 5/2005 | Segota et al. ............ 244/130 |
| 2005/0106017 | A1 | * | 5/2005 | Segota et al. .................... 416/1 |
| 2006/0064962 | A1 | * | 3/2006 | Wehner .................... 60/232 |

OTHER PUBLICATIONS

USPTO Trademarks Database Searched for "DARGAN"—no results Dec. 15, 2004.*

Aerodynamic DRAG; file://E:\STUDY\Aerodynamic%20Drag%20at%20High%20Speeds.htm; 9 pgs; Jun. 6, 2003.

Aerodynamics of Wind Turbines: Drag; http://www.windpower.org/en/tour/wtrb/drag.htm; 4 pgs; Sep. 12, 2003.

Airfoils and Lift; http://www.aviation-history.com/theory/airfoil.htm; 2 pgs; Sep. 12, 2003.

Bernoulli Equation; file://E:\STUDY\Pressure.htm; 6 pgs; Jun. 6, 2003.

Boundary layer and turbulence modeling: a persona; perspective; R.A. Brown; 10 pgs; Mar. 20, 1995.

Boundary Layer Control; http://www.aerodyn.org/Drag/blc.html; 4 pgs; Sep. 12, 2003.

Boundary-Layer Separation; http://www.ma.man.ac.uk/~ruban/blsep.html; 4 pgs; Sep. 12, 2003.

Boundary layer and turbulence modeling: a persona; perspective; http://www.atmos.washington.edu/~rabrown/amspblt6.html; 8 pgs; Jun. 4, 2003.

Bubble Plumes and the Coanda; http://66.218.71.225/search/cache?p=coanda+experiments&ei=UTF-8&xargs=0&b=21&url=...; 6 pgs; May 22, 2003.

Chapter 6: Aerodynamics; http://www.scitoys.com/scitoys/scitoys/aero/aero.html; 10 pgs; May 22, 2003.

Coanda Effect: Understanding Why Wings Work; http://www.jefraskin.com/forjef2/jefweb-compiled/published/coanda_effect.html; 21 pgs; May 22, 2003.

The Coanda Effect; http://jnaudin.free.fr/html/coanda.htm; 3 pgs; May 22, 2003.

The Coanda Saucer or the "Repulsin type A" test; http://jnaudin.free.fr/html/repcotst.htm; 6 pgs; May 22, 2003.

The Continuity Equation, the Reynolds Number, the Froude Number; file://E:\STUDY\88_06_04&20The%20Continuity%20Equation,%20the%20Reynolds%20Nu...; 10 pgs; Jun. 6, 2003.

Deltawing; http://www.aero.hut.fi/Englanniksi; 1 pg.

Drag of Blunt Bodies and Streamlined Bodies; http://www.princeton.edu/~asmits/Bicycle_web/blunt.html; 4 pgs; Sep. 12, 2003.

The effects of quadratic drag on the inverse cascade of two-dimensional turbulence; N. Grianik, I. Held, K.S. Smith, and G.K. Vallis; 16 pgs; Jul. 2002.

Henri Coanda; http://www.deltawing.go.ro/history/coanda.htm; 3 pgs; May 22, 2003.

Henri Coanda Romanian Scientist (1886-1972); http://romania-on-line.net/halloffame/CoandaHenri.htm; 3 pgs; May 22, 2003.

Henri Marie Coanda; http://www.allstar.fiu.edu/aero/coanda.htm; 5 pgs; May 22, 2003.

History of The "Coanda Effect"; http://www.geocities.com/ResearchTriangle/Lab/1135/coanda.htm; 13 pgs; May 22, 2003.

Lift, Thrust, Weight, and Drag; http://www.av8n.com/how/htm/4forces.html; 9 pgs; Jun. 4, 2003.

M.E. Research Page; file://E:\STUDY\fish%20separation.htm; 4 pgs; Jun. 6, 2003.

MicroCluster Water; http://www.aquatechnology.net/Microcluster_water.html; 7 pgs; May 22, 2003.

Misinterpretations of Bernoulli's Law; http://www.rz.uni-frankfurt.de/~weltner/Mis6/mis6.html; 11 pgs; Sep. 12, 2003.

A Physical Description of Flight; http://www.aa.washington.edu/faculty/eberhardt/lift.htm; 15 pgs; Sep. 12, 2003.

Post-processing of wake survey data from wind tunnel tests; http://www.nlr.nl/public/facilities/f217-01/; 5 pgs; Jun. 4, 2003.

Pressure; file://E:\STUDY\Pressure7.htm; 3 pgs; Jun. 6, 2003.

Pressure Patterns on the Airfoil; http://www.dynamicflight.com/aerodynamics/pres_patterns/; 2 pgs; Sep. 12, 2003.

The Schauberger's Flying Saucer; http://jnaudin.free.fr/html/repulsin.htm; 7 pgs; May 22, 2003.

Separation on a Free Surface; http://www.maths.cam.ac.uk/CASM/essays/abstracts/node84.html; 2 pgs; Sep. 12, 2003.

Similarity Parameters; http://www.lerc.nasa.gov/WWW/K-12/airplane/airsim.html; 3 pgs; Sep. 12, 2003.

Using the Coanda Effect; http://www.aardvark.co.nz/pjet/coanda.shtml; 3 pgs; May 22, 2003.

Virtual Experiments on Drag Reduction; Vladimir Kudriavtsev and M. Jack Braun; 48th Annual Conference of Canadian Aeronautics and Space Institute (CASI), 8th Aerodynamics Section Symposium, Toronto, Canada; 6 pgs; Apr. 29-May 2, 2001.

* cited by examiner

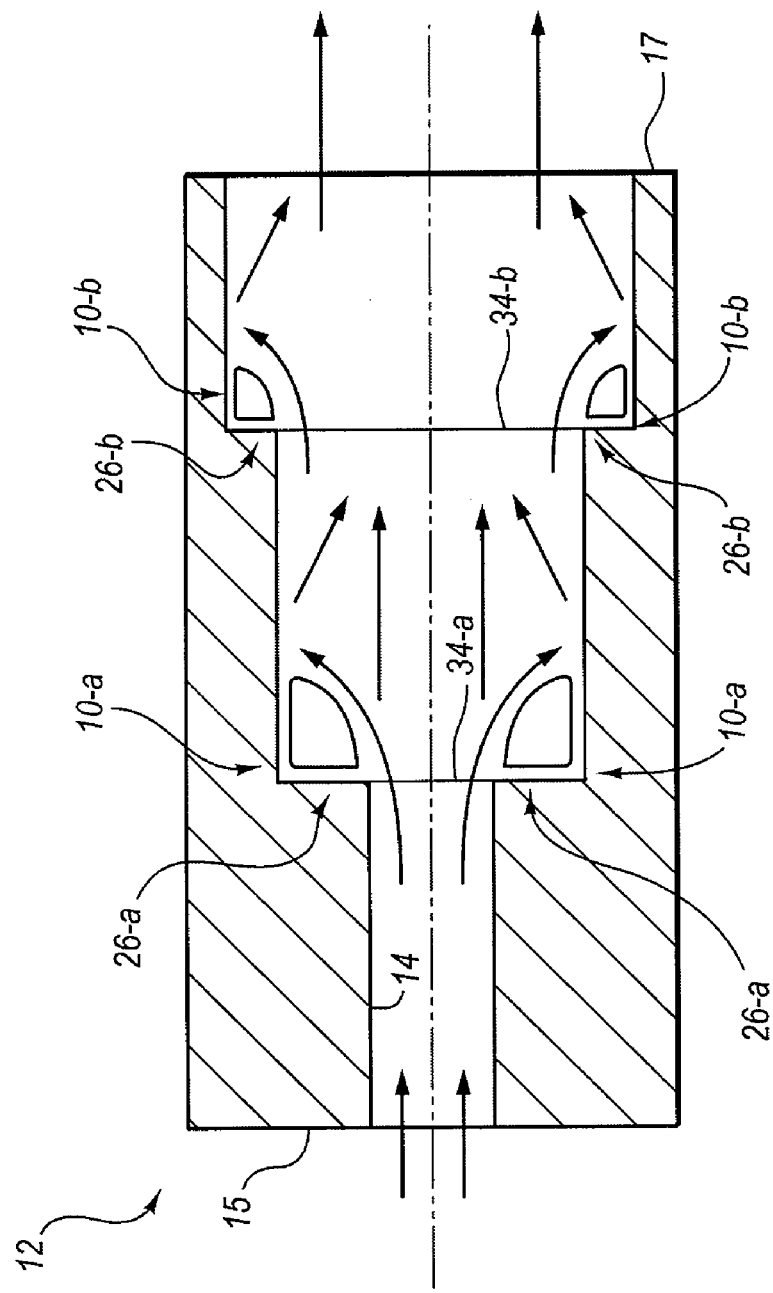
FIG. 2-A

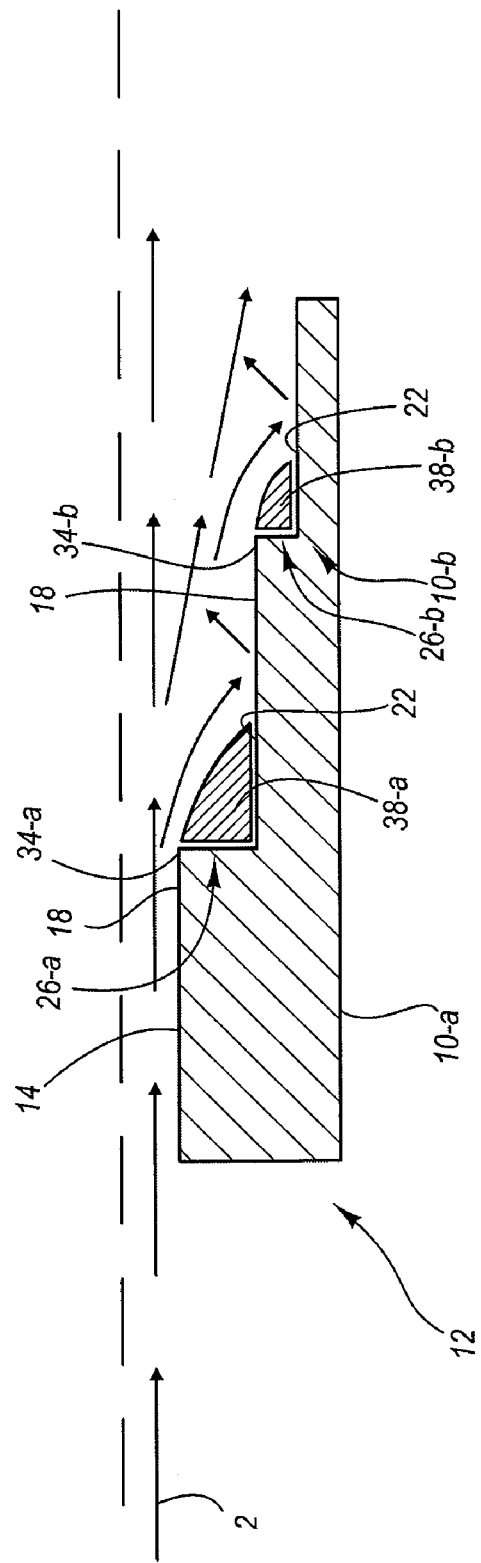
FIG. 2-B

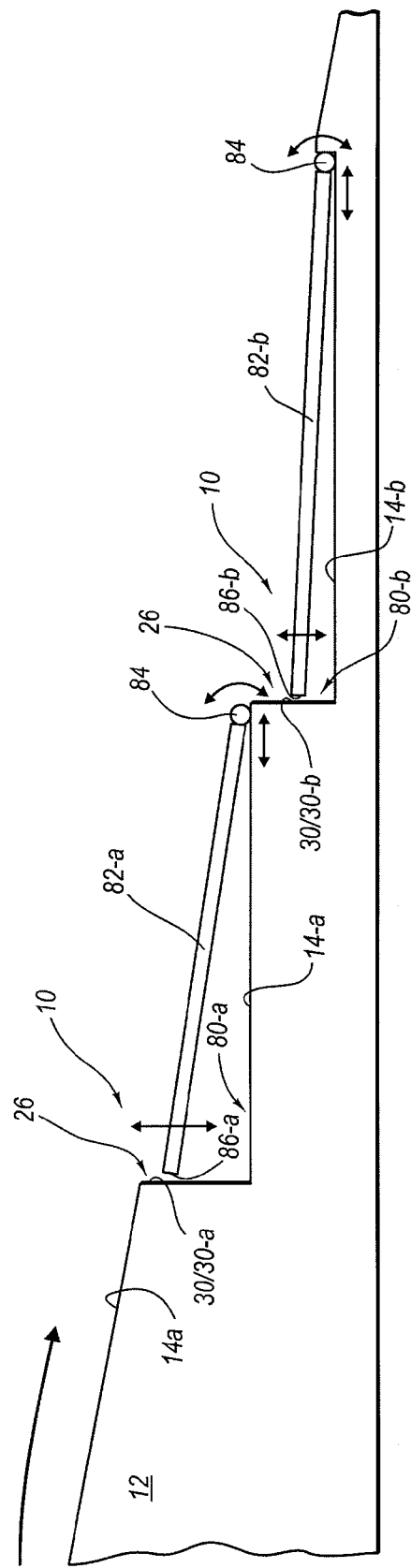
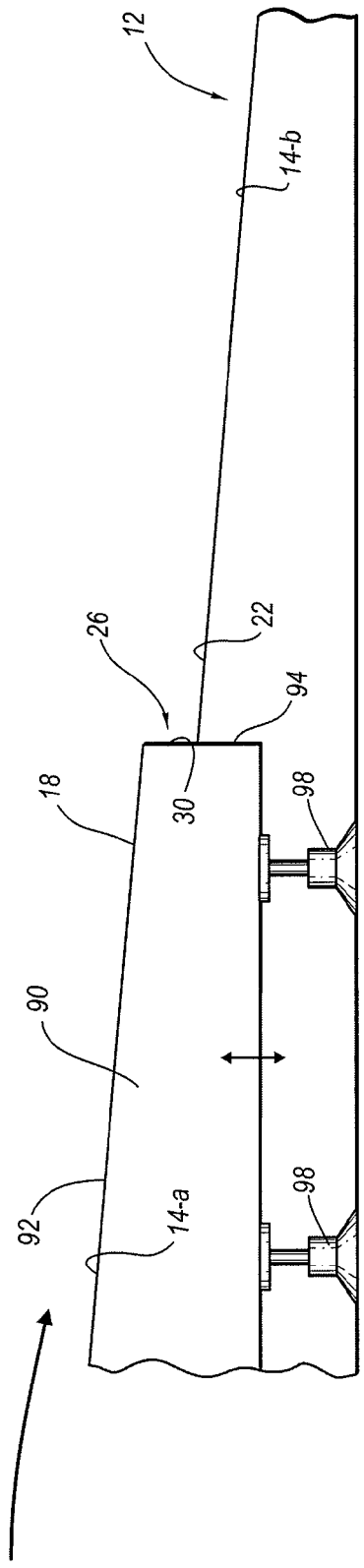
FIG. 7-A
FIG. 7-B

METHOD AND SYSTEM FOR REGULATING INTERNAL FLUID FLOW WITHIN AN ENCLOSED OR SEMI-ENCLOSED ENVIRONMENT

RELATED APPLICATION

This application claims priority to U.S. Provisional Application Ser. No.60/390,510, filed Jun. 21, 2002, and entitled, "System and Method for Using Surface Pressure Gradient Regulators to Control and Improve Fluid Flow Over the Surface of an Object," which is incorporated by reference in its entirety herein.

BACKGROUND

1. Field of the Invention

The present invention relates to internal fluid flow within an enclosed or semi-enclosed environment or structure, and particularly, to a method and system for influencing and regulating the properties and characteristics of the internal fluid flow, and thus the fluid flow itself, within an internal flow structure, such as a conduit, pipe, or nozzle, which, in effect, optimizes the fluid flow, thus increasing the efficiency of the internal flow structure, as well as the actual flow properties and characteristics of the fluid.

2. Background of the Invention and Related Art

As an object moves through a fluid, or as a fluid moves over the surface of an object, the molecules of the fluid near the object become disturbed and begin to move about the object. As the fluid continues to move over the object's surface, those molecules adjacent the surface of the object have the effect of adhering to the surface, thus creating negative forces caused by the collision of these molecules with other molecules moving in the free stream. The magnitude of these forces largely depends on the shape of the object, the velocity of fluid flow with respect to the object, the mass of the object, the viscosity of the fluid, and the compressibility of the fluid. The closer the molecules are to the object, the more collisions they have. This effect creates a thin layer of fluid near the surface in which velocity changes from zero at the surface to the free stream value away from the surface. This is commonly referred to as the boundary layer because it occurs on the boundary of the fluid. The collision of molecules at the surface of an object creates inefficient and unpredictable fluid flow, such as drag, and inevitably turbulence and vortexes.

Most things in nature try to exist within a state of equilibrium. The same is true for fluid flow over the surface of objects found in natural environments. For example, during a wind storm over the dessert, or a snow storm over a field, or even the sand on the beach as the water flows over and over, evidence exists that a state of equilibrium between the fluid flow and the surface over which the fluid is flowing is trying to be reached. As conditions are not perfect and the flow must be less than completely laminar, the surface of these natural conditions forms several sequential ripples or ledges that indicate the fluid and the surface are reaching as close a state of equilibrium as possible. Just like in nature, manufactured conditions and situations are equally not able to reach perfect conditions of fluid flow.

The study of aerodynamics over a surface has been extensive. However, over the years, the prevailing theory or idea has been that smoother or streamlined is better and operates to optimize fluid flow. As such, every conceivable manufactured device or system in which fluid passes over the surface of an object has been formed with the surface being as smooth and streamlined as possible.

The fields of fluid dynamics and aerodynamics study the flow of fluid or gas in a variety of conditions. Traditionally this field has attempted to explain and develop parameters to predict viscous material's behavior using simple gradient modeling. These models have enjoyed only limited success because of the complex nature of flow. Low velocity flow is easily modeled using common and intuitive techniques, but once the flow rate of a fluid or gas increases past a threshold, the flow becomes unpredictable and chaotic, due to turbulence caused by the interaction between the flowing material and the flow vessel. This turbulence causes major reductions in flow rate and efficiency because the flow must overcome a multi-directional forces caused by the turbulent fluid flow.

Attempts to improve flow rate and efficiency, scientists and engineers have traditionally accepted the principle that the smoother the surface the material is passing over, the lower the amount of turbulence. Thus efforts by scientists and engineers to improve flow and efficiency rates have generally focused on minimizing the size of the surface features across which the material is flowing. Because the turbulence is caused by micro-sized surface features, efforts to minimize these them have always been limited by the technology used to access the micro-sized world.

Turbulence occurs at the rigid body/fluid or gas interface also know as the boundary layer. The flowing material behaves predictably i.e. in a laminar fashion, as long as the pressure down flow remains lower than the pressure up flow. Generally as the rate of flow increases the pressure also increases, and the pressure gradient in the boundary layer becomes smaller. After a certain threshold is achieved, the flow closer to the rigid body is much slower than the flow outside the boundary layer, thus the pressure directly in the orthogonal direction from the rigid body is less than the pressure down flow. This causes the kinetic energy of the molecules in the boundary layer to move in the direction of the lowest pressure, or away from the rigid body. This change in the direction of the material, from moving in the direction of flow to moving across the direction of flow in the boundary layer creates vortices within the boundary layer and along the rigid body. These vortices create drag because the direction of flow as well as the kinetic energy of the particles is not in the down flow direction alone, but in a variety of directions. As a result, large amounts of energy are required to overcome the drag force, lowering the flow rate and efficiency.

Developments in the past few decades have improved on the traditional understanding of flow over a rigid body, resulting in advances in mathematical and computer modeling, as well as improved theoretical understanding of a material's behavior under non-ideal circumstances. Most of these advances have focused on improving the flow surface.

One such example of an improved flow surface is to use a rough flow surface that creates myriad miro-vortices much like a shark's skin or sand paper. It is thought that these small turbulence zones inhibit the creation of larger and more drag creating vortices. While these rough materials have been used in advanced racing yacht hulls as well as in swimming suite materials, there is still not a large improvement over smooth surfaces. Thus the state of the art is still struggling to understand turbulent flow beyond specific equations, and applications are still slowed by the drag and inefficiency caused by the turbulent flow.

SUMMARY AND OBJECTS OF THE INVENTION

The present invention seeks to offer a solution to much of the internal fluid flow problems within an internal flow device or system, such as a nozzle, conduit, exhaust system, and any other enclosed or semi-enclosed internal fluid flow structure encountering fluid flow in either a controlled or natural environment. In its most general theoretical description, the present invention features a fluid flow regulator that functions to significantly influence and optimize fluid flow about the one or more surfaces existing within an internal flow device. More specifically, the present invention fluid flow regulator functions to significantly regulate the pressure gradients that exist about the surfaces within an internal flow device or system subject to one or more fluid mediums, such as gas, liquid or a combination of these. The regulation of pressure gradients is accomplished by reducing the pressure drag at various locations along the surfaces, as well as the pressure drag induced forward and aft of the surface, via a pressure recovery drop. Reducing the pressure drag in turn increases pressure recovery or pressure recovery potential, which pressure recovery subsequently lowers the friction drag along the surfaces. By reducing or lowering friction drag, the potential for fluid separation is decreased, or in other words, attachment potential of the fluid is significantly increased. All of these effects may be appropriately and collectively phrased and referred to herein as optimization of fluid flow, wherein the fluid flow, its properties and characteristics (e.g., separation, boundary layer, laminar vs. turbulent flow), and its relationship to the internal flow device or system are each optimized, as well as the performance characteristics of the internal flow device or system.

In a preferred embodiment, fluid flow regulators are strategically positioned and oriented about a surface so as to induce the most optimal fluid flow and reduce fluid separation or increase the attachment potential of the fluid. Fluid flow regulators are preferably positioned at an optimal pressure recovery point, several of which may exist about a surface. An optimal pressure recovery point is defined as a location on the surface that signals an adverse pressure caused by an imbalance in flow pressures, such that the potential for fluid separation is increased. If several optimal pressure recovery points exist, then multiple fluid flow regulators may be used to regulate the pressure and restore attached laminar flow.

Being able to regulate the pressure at any given area or areas on the surface of an object over which fluid may pass will provide for the direct regulation of velocity, density, and viscosity of the fluid as well. Controlling these parameters will allow the flow to be optimized for any conceivable condition or environment.

It is contemplated that the present invention is applicable or pertains to any type of fluid, such as gaseous fluids and liquids.

In accordance with the invention as embodied and broadly described herein, the present invention further features a fluid control system and method for controlling the fluid flow within an internal flow device or system to optimize the flow of the fluid and to reduce its disruptive behavior. The fluid flow control system of the present invention utilizes one or more fluid flow regulators, or ledges, to create a sub-atmospheric barrier or a reduced pressure shield about the surface of the device or system, wherein the molecules of the boundary layer are unable to sufficiently adhere to the surface and collide with other molecules to create inefficient fluid flow. As such, these molecules flow across or over the surface of the object in a more efficient manner than known standard aerodynamic surfaces.

In a preferred embodiment, the fluid flow control system comprises: a fluid flowing at an identifiable velocity and pressure and having a specific density; an internal flow device or system having an identifiable surface, wherein the fluid flow is introduced to and flows about at least a portion of the surface; and at least one fluid flow regulator featured with the surface of the internal flow device, wherein a surface pressure may be regulated at any point along said surface, and wherein the fluid flow regulator comprises a drop point and a drop face extending from the drop point at a substantially perpendicular angle from the object's surface and existing in the direction of flow of said fluid, the fluid flow regulator designed to induce a sub-atmospheric barrier at the pressure gradient regulator, and wherein the fluid flow regulator ultimately causes a reduction of turbulence and separation potential and an increase in laminar flow of the fluid within the internal flow device.

In an alternative embodiment, the fluid control system comprises a fluid flowing at an identifiable velocity and pressure; a first surface existing in a first plane and comprising a surface area, wherein the fluid flows across at least a portion of the first surface; a second surface also comprising a surface area, the second surface existing in a second plane that is offset from the first plane in a substantially parallel relationship, wherein the second surface extends from the first surface in the direction of flow of the fluid; and a fluid flow regulator relating the first surface to the second surface and comprising similar elements as described above, as well as the drop face of the pressure gradient regulator extends from the first surface at a substantially perpendicular angle.

The present invention further features a method for controlling the flow of a fluid within an internal flow device comprising the steps of obtaining an internal flow device subject to fluid flow, the device having one or more fluid carrying surfaces over which a fluid passes; and incorporating or featuring one or more fluid flow regulators in the fluid carrying surfaces, wherein the fluid flow regulators comprise similar elements and features as described above.

With proper selection of the design parameters of the one or more fluid flow regulators, the resulting disturbances in the laminar boundary at the surface can be decreased so that boundary layer separation as described above, relative to where the separation would have occurred in the absence of a fluid flow regulator, may be virtually eliminated. The surface pressure gradient allows the pressure at any area on a surface to be regulated with the goal of achieving less turbulent and more laminar fluid flow across and leaving the surface of the object.

The present invention is applicable to any internal fluid flow device or system. In several preferred embodiments, the present invention comprises or features one or more fluid flow regulators within an internal flow device, such as a Dargan nozzle that is similar in form to a venturi nozzle, but significantly outperforms a venturi nozzle when compared, an exhaust system (e.g. a gas turbine jet engine exhaust system), and any type of conduit.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2-A illustrates a cross-section of the internal flow device featured in FIG. 1, wherein the touch and go flow pattern is illustrated;

FIG. 2-B illustrates a cross-section taken down the centerline of internal flow device featured in FIG. 1, wherein the touch and go flow pattern is further illustrated;

FIG. 7-A illustrates a side cross-sectional view of one exemplary embodiment of a plurality of dynamic fluid flow regulators showing how the fluid flow regulators may be adjustable to accommodate varying conditions or fluid behavior across the surface of an internal flow device;

FIG. 7-B illustrates a side cross-sectional view of another exemplary embodiment of a plurality of dynamic fluid flow regulators showing how the fluid flow regulators may be adjustable to accommodate varying conditions or fluid behavior across the surface of an internal flow device;

DETAILED DESCRIPTION OF THE PREFERRED EMBODIMENTS

Figure 1:
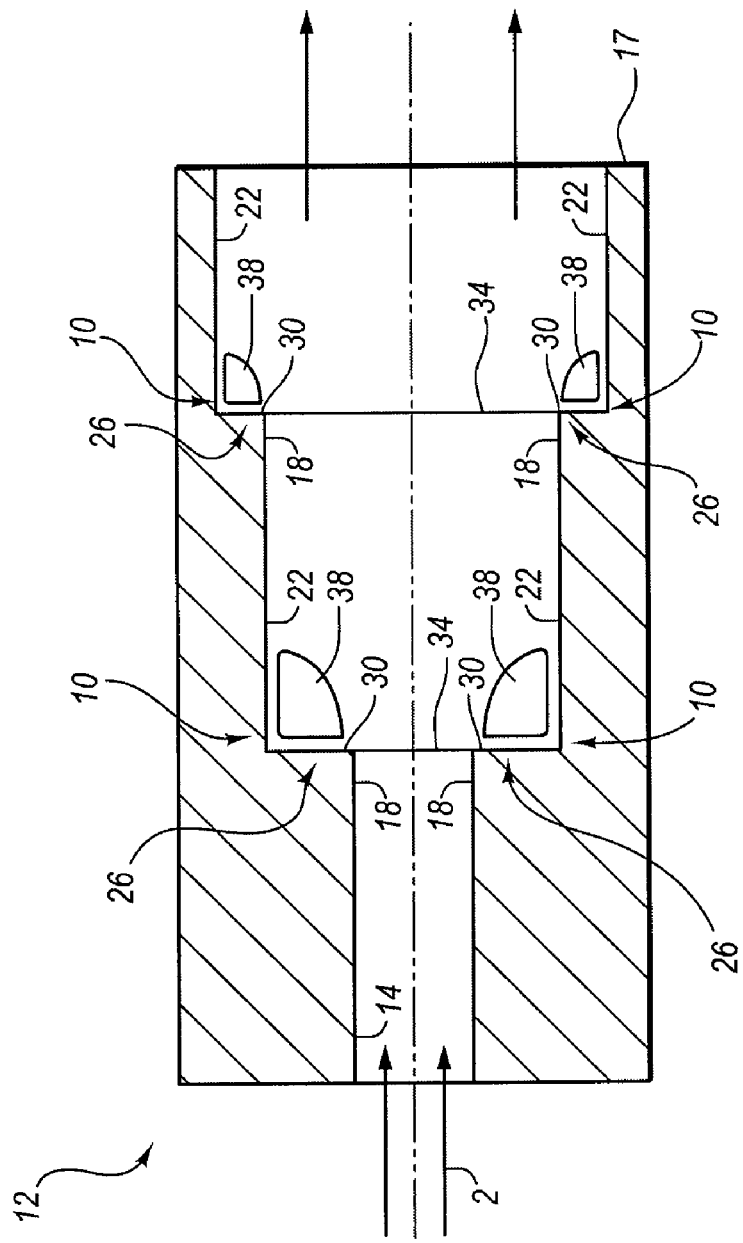
FIG. 1 illustrates a cross-section of an internal flow device comprising or featuring a plurality of fluid flow regulators according to one exemplary embodiment of the present invention.

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 9, is not intended to limit the scope of the invention, as claimed, but is merely representative of the presently preferred embodiments of the invention. The presently preferred embodiments of the invention will be best understood by reference to the Figures, wherein like parts are designated by like numerals throughout.

The following more detailed description will be divided into several sections for greater clarity and ease of discussion. Specifically, the following more detailed description is divided into two sections. The first section pertains to and sets forth a general discussion on improving and regulating internal fluid flow within an enclosed or semi-enclosed structure, including nozzles, modified venturies, and conduits, using the present invention systems and methods presented herein. The second section pertains to and sets forth more specific descriptions of several exemplary nozzles, modified venturies, exhaust systems, and conduits, each featuring the fluid flow regulating system and method of the present invention as set forth herein. These sections and the descriptions and embodiments within these sections, are not to be construed as limiting in any way, but are provided for the ease and convenience of the reader.

Improving and Regulating Fluid Flow Over any Internal Surface

The present invention seeks to provide new insight into the complex nature of internal fluid flow within an enclosed or semi-enclosed structure, wherein the fluid may comprise any fluid medium, such as gaseous (e.g., air), liquid (e.g., water, fuel), particulate, and any combination of these. Specifically, the present invention seeks to provide a shifting or altering of the current conceptual understanding of internal fluid flow within a closed or semi-enclosed environment by presenting various methods and systems that significantly improve, influence, control, and regulate fluid flow within the enclosed or semi-enclosed structure, namely in terms of the mechanics, behavior, and characteristics of the fluid flow, and that significantly improve the efficiency and performance of internal flow devices or systems. Stated differently, the concepts underlying the systems and methods of the present invention, as well as the systems and methods themselves, as set forth herein, denote and suggest a profound paradigm shift from traditional and current thinking and concepts pertaining to internal fluid flow and fluid flow within a closed or semi-closed environment, and particularly pertaining to the common conception that streamlined or smooth surfaces are the best way to achieve optimal fluid flow within an enclosed or semi-enclosed area (an internal flow device or system). Having said this, although significantly altering current thinking, the present invention seeks to further the understanding of internal fluid flow and is designed to be utilized in conjunction with several of the technological developments and concepts relating to internal fluid flow that have developed over the years. As such, it is contemplated that the present invention will both frustrate and augment or supplement current internal fluid flow concepts and technology, depending upon their applicability to the present invention technology.

As discussed above, the study of internal fluid flow over the last several decades has been immense, with new ideas and technologies developing at a rapid pace. However, as also discussed above, one core fundamental concept regarding internal fluid flow within enclosed and semi-enclosed environments or internal flow devices, upon which mass studies and development of technology has been based, has always been assumed—that a smooth or streamlined surface is the best possible surface for achieving optimal fluid flow. However, as is shown herein, it is believed that this core fundamental concept is somewhat flawed, and that it is upon this basis that the present invention seeks to offer or presents a paradigm shift in the complex field of fluid mechanics.

Simply stated, the present invention will allow the design of objects, bodies, devices, and systems otherwise thought to be optimal to be improved upon.

Typically, a fluid moving through an enclosed or semi-enclosed structure, such as a nozzle, conduit, or venturi (hereinafter referred to as an internal flow device), experiences several different types of dynamic forces during its course of travel or flow. As the fluid flows within the structure, the molecules in the fluid may become disturbed or upset, wherein they try to move about the structure in order to once again achieve a state of equilibrium. The dynamic (or aerodynamic) forces and their magnitude or influencing degree are dependent upon several factors, as discussed herein. However, some of the most critical factors are the velocity of the fluid, the viscosity of the fluid, the compressibility of the fluid, and the pressure within the internal flow device. These are also largely interrelated.

In regards to viscosity, as fluid flows within an internal flow device or system a boundary layer is created. This boundary layer acts as a molecular barrier of fluid particles between the free flowing fluid and the surface of the device or system. The magnitude of the dynamic forces at work and interaction of molecules contributes to the viscosity. However, if the dynamic forces change, the viscosity of the fluid may change and this boundary layer may separate from the surface and contribute to the drag forces of the fluid flow within the internal flow device.

Drag forces manifest themselves in the form of pressure drag forces (pressure drag) and friction drag forces (friction drag), which are both related to one another. Friction drag results from the friction between the molecules in a fluid and the molecules in a surface as the fluid passes over the surface. Pressure drag is generated by the eddying motions that are created in the fluid by the passage of the fluid over the surface (or within the internal flow device). Pressure drag is less sensitive to the Reynolds number of the fluid than friction drag. Although both pressure and friction drag are directly related to the viscosity of the fluid, it is useful to define each of these and their characteristics because they each are the result of different flow phenomena. Frictional drag is more of a factor during attached flow where there is little or no separation and it is related to the surface area exposed to the fluid flow. Pressure drag is an important factor when discussing and analyzing separation and its starting points and is related to the cross-sectional area of the object.

The compressibility of the fluid is also important. As fluid flows about the surface within an internal flow device, the molecules in the fluid are actively moving. In the case of a dense fluid, relatively speaking, such as water, the density will remain mostly constant, even at higher velocities. If the fluid is not as dense, such as with air, the density will most likely not remain constant. Instead, the fluid will become compressed, thus changing the density of the fluid. As the density changes, the forces induced within the internal fluid flew device by the fluid will also change.

Unlike external fluid flow where the fluid exists in a largely uncontrollable environment leading to many unknowns about the fluid and the dynamic forces at work, the dynamic forces at work within a closed or semi-closed environment are much more predictable because the conditions and characteristics of both the device or system and the fluid are more easily controlled. For instance, the pressure within the device, the velocity of the fluid, and the density of the fluid may all be pre-determined and controlled to change as needed or required.

In its broadest implication, or in its highest level of abstraction, the present invention describes a method and device and system for influencing and regulating internal fluid flow, namely its properties or characteristics and behavior, through an internal flow device. The device and/or system comprises one or more fluid flow regulators strategically designed, positioned, oriented, and featured within the internal flow device about its surface(s). The method comprises introducing or incorporating or featuring one or more fluid flow regulators onto/into/with the surface of the device, by creating a surface featuring a fluid flow regulator, or altering an existing surface to comprise one or more fluid flow regulators. In a preferred embodiment, the fluid flow regulator comprises a Dargan™ fluid flow regulator having a Dargan™ drop, that induces or generates a Dargan™ barrier, which technology is designed and owned by Velocity Systems, Ltd. of Salt Lake City, Utah 84111.

With reference to FIGS. 1 and 2, shown is a cross-sectional view of one exemplary enclosed internal flow device, namely internal flow device 12 having a surface 14 therein. Internal flow device 12 is shaped in the form of a conduit that fluid 2 flows through. Featured with surface 14 are fluid flow regulators 10 (Dargan fluid flow regulators) designed to both influence, control, and regulate the flow of fluid 2 (indicated by the direction arrow in each of the Figures herein) about surface 14 of internal flow device 12. Structurally, fluid flow regulators 10 each comprise a leading edge 18, a trailing edge 22, and a pressure recovery drop 26 (a Dargan drop) having a drop face 30, wherein pressure recovery drops 26 are strategically placed at an optimal pressure recovery point 34, so as to induce or create a sub-atmospheric barrier 38 (Dargan barrier) at the base of drop face 30. Pressure recovery drop 26 may comprise multiple drop faces 30 (see FIG. 3).

Leading edge 18 is an area of surface or surface area existing on surface 14 that leads into a pressure recovery drop 26 and that is positioned as close to an optimal pressure recovery point 34, as possible, which is described in detail below. Thus, depending upon different conditions and situations, there may be one or a plurality of optimal pressure recovery points 34 within an internal flow device and along its surface, thus requiring a plurality of fluid flow regulators 10 (see FIG. 4). It could also be said that leading edge 18 is a surface area that extends outward in a rearward direction from the top of drop face 30 of pressure recovery drop 26 an identified distance, or that leading edge 18 is a surface area that precedes pressure recovery drop 26, each with respect to the direction of fluid flow. Leading edge 18 may be of any size and shape as desired or called for as dictated by design parameters. However, it should be noted that leading edge 18 must be of sufficient length to receive fluid flow 2 thereon, or contribute to the flow of fluid on surface 14.

Pressure recovery drop 26 follows leading edge 18 in the direction of fluid flow and provides a drop in the surface in which fluid 2 is flowing over. Structurally, pressure recovery drop 26 is preferably orthogonal or substantially orthogonal and comprises a surface area or drop face 30 that is perpendicular or substantially perpendicular to leading edge 18, and preferably ninety degrees 90° perpendicular. The angle at which drop face 30 extends from leading edge 18, although preferably ninety degrees, may comprise a range of degrees depending upon operational constraints. This range may be slightly greater or slightly less than ninety degrees as needed as long as the function of fluid flow regulator 10 is not frustrated. Pressure recovery drop 26, and particularly drop face 30 extends perpendicularly from leading edge 18 toward trailing edge 22 so that it comprises an identified and pre-determined drop face distance. In other words, pressure recovery drop extends between leading edge 18 and trailing edge 22 and exists or is postured in a sub-fluid arrangement, such that the fluid 2 will always encounter pressure drop 26 from leading edge 18 and effectively fall off of drop face 30. This is true no matter how surface 14 is oriented (e.g., horizontal, vertical, on an angle, etc.). Fluid flow in the opposite direction where the fluid flows up pressure recovery drop 26 is not intended and is contrary to the present invention.

Pressure recovery drop 26 is positioned at or as precisely proximate an optimal pressure recovery point 34 as possible, the reason being explained in detail below. The distance that pressure recovery drop 26 extends from leading edge 18, or the height of drop face 30 is critical. The greater the height, the greater the pressure drop and the more pressure drag is reduced, which leads to an increase in pressure recovery at the surface and greater reduction in friction drag. All of this functions to increase the fluid attachment potential, or stated another way, reduce the separation potential of the fluid. Conversely, the shorter the height of drop face 30, the less the magnitude of the pressure drop and the less pressure drag is reduced. The less pressure drag is reduced, the less pressure recovery there will be at the surface, which subsequently leads to less fluid attachment potential. However, the drop face distance is a calculated distance that depends upon the fluid flow conditions at the particular location of the optimal pressure recovery point where the fluid flow regulator is to be positioned. Therefore, the height of drop face 30 is specifically calculated for every fluid flow situation that fluid might encounter within the internal flow device, which drop face height is pre-determined prior to or during fluid flow. The calculation of the height of drop face 30 is based upon several design, fluid, and other physical factors, as well as on several environmental conditions. Some of these factors or conditions include the particular type of fluid flowing about the internal flow device's surface, the velocity of fluid, the viscosity of fluid, the temperature of fluid, the direction of the flow of the fluid, the type and texture of the surface, the geometric area of the internal flow device's surface both before and after the pressure recovery drop, the magnitude or range of pressure existing within the internal flow device, and others. For example, the height of drop face 30 may not need to be as high if the fluid medium is a liquid because the pressure recovery will be quick as compared to a gaseous medium. Thus, for similar flow properties and/or characteristics using a gaseous medium, the height of drop face 30 may be much greater to achieve the same optimal flow characteristics. From this it can be seen that drop face 30 is, among other things, very density dependent. Pressure recovery drop 26 may also be variable in that it's height may be adjustable to account for changing or varying factors/conditions, a concept discussed below.

Trailing edge 22 is similar in structure to leading edge 18, only instead of preceding pressure recovery drop 26, trailing edge 22 extends away from pressure recovery drop 26 with respect to the direction of fluid flow so that fluid flow 2 passes over leading edge 18, then pressure recovery drop 26, and then finally trailing edge 22. Trailing edge 22 extends outward in a forward direction from pressure recovery drop 26, and particularly from the bottom of drop face 30. Just like leading edge 18, trailing extends an identified distance and provides a trailing flow boundary for said fluid. Both leading edge 18 and trailing edge 22 are defined in relation to the direction of fluid flow (represented by the arrows).

In the embodiment shown in FIGS. 1 and 2, leading edge 18 and trailing edge 22 are integrally formed with surface 14 so that they are actually part of surface 14. Other embodiments, shown and described below, are presented herein where leading edge and/or trailing edge are not integrally formed with surface 14. Moreover, FIGS. 1 and 2 illustrate the use of one or a plurality of such regulators along a single surface, depending upon several factors, including design requirements of the internal flow device, fluid flow, fluid type, environmental factors, and any others relating to fluid flow over a surface.

As stated above, the present invention recognizes what may be termed as an optimal pressure recovery point 34. Optimal pressure recovery point 34 is defined herein as the point(s) or location(s) about surface 14 at which there is an imbalanced or unequal pressure gradient forward and aft of fluid 2, thus creating adverse pressure within internal flow device 12, which adverse pressure gradient induces friction and pressure drag that ultimately increases the separation potential of fluid 2. As such, the presence of adverse pressure signals less than optimal flow. The location of each optimal pressure recovery point is a calculated determination that dictates the placement of fluid flow regulators 10. Moreover, the location of optimal pressure recovery point(s) will vary between internal flow devices depending upon velocity of the fluid, pressure within the internal flow device, viscosity of the fluid, density of the fluid, and the physical characteristics of the internal flow device.

With reference to FIGS. 2-A and 2-B, shown is the exemplary internal flow device 12 illustrated in FIG. 1. These Figures illustrate the effective "touch and go" or pulse flow phenomenon created by fluid flow regulators 10 featured within internal flow device 12. Specifically, FIG. 2-A illustrates a cross-sectional view of device 12, and FIG. 2-B illustrates a partial cross-sectional view taken down the centerline of device 12 in FIG. 2-A. As can be seen, fluid 2 enters internal flow device 12 at intake 15 and exits at discharge 17. What happens between intake 15 and discharge 17 within fluid flow device 12 is unique to the present invention. As fluid 2 enters intake 15, it flows about surface 14, wherein various fluid dynamic forces act upon fluid 2, thus inducing a state of imbalance within fluid 2. This imbalance induces an adverse pressure gradient that, if left unregulated, will cause fluid 2 to detach from surface 14 and become very turbulent. As such a fluid flow regulator 10 is precisely positioned at an optimal pressure recovery point 34. Optimal pressure recovery point 34 is defined herein as a location about surface 14 at which attached fluid comprises a pressure differential that generates an adverse pressure gradient acting to induce fluid separation.

As such, optimal pressure recovery points 34 are predetermined and defined in each internal flow device. Moreover, a fluid flow regulator 10 is never randomly positioned, but instead strategically placed at an optimal pressure recovery point. Thus, fluid flow regulator 10-*a* of FIG. 2-A is correctly positioned at optimal pressure recovery point 34-*a* as this location will provide the ability to regulate the pressure gradient in fluid 2 as needed. To regulate the inherent pressure gradient, fluid flow regulator 10-*a* performs a pressure recovery function. As fluid 2 enters intake 15 and travels about surface 14 it encounters fluid flow regulator 10-*a* comprising a pressure recovery drop 26 and drop face 30. As fluid passes over pressure recovery drop 26 it encounters sub-atmospheric barrier 38. Because this is a low pressure barrier, fluid 2 literally drops off of pressure recovery drop 26 and contacts surface 14 as indicated by the arrows. The fluid then briefly detaches from the surface (indicated by the upward arrows) and then subsequently reattaches almost instantaneously, wherein fluid 2 is re-energized. This "touch and go" phenomenon functions to recover pressure at the optimal pressure recovery point 34, wherein the pressure gradient is reduced and the pressure differential cured. All of this effectually allows fluid 2 to continue in an attached state, as well as in a returned state of equilibrium. The drop in pressure is made instant so that the adverse dynamic forces acting on fluid 2 may be overcome and eliminated.

It is recognized that fluid 2 may still comprise somewhat of a pressure differential downstream from fluid flow regulator 10. In addition, it is recognized that fluid flow conditions within an internal flow device may change or vary. Therefore, internal flow device 12, and particularly surface 14, may comprise or feature several optimal pressure recovery points 34 requiring a plurality of fluid flow regulators. In this case, it becomes necessary to determine the location of subsequent optimal pressure recovery point(s) 34, shown as pressure recovery point 34-b. The location of second optimal pressure recovery point 34-b downstream from primary or first optimal pressure recovery point 34-a is also predetermined and comprises a calculated location determined preferably as follows. Once fluid 2 passes over primary optimal pressure recovery point 34-a it briefly separates, then reattaches in a re-energized state as discussed above. However, if pressure gradients remain in fluid 2 these must be equalized or the flow of fluid 2 within internal flow device is not truly optimal or optimized. As such, second fluid flow regulator 10-b is placed at optimal pressure recovery point 34-b. The location of second pressure recovery point 34-b is located at a location at least past the point at which fluid 2 re-attaches after encountering and passing over fluid flow regulator 10-a and pressure recovery drop 26-a. If second fluid flow regulator 10-b is placed at a location on surface 14 encountered by fluid 2 prior to it reattaching to surface 14, then the disruption in fluid 2 is only exacerbated and the fluid will be significantly less than optimal. This is because as fluid 2 drops over first or primary pressure recovery drop 26 and detaches from surface 14, it suddenly expends its energy stored within the molecules making up fluid 2. This energy is retrieved as fluid 2 reattaches to surface 14. If second fluid flow regulator 10-b is placed at a location where the fluid is in this detached state, the second drop in pressure would induce a significant adverse pressure gradient that would cause the fluid to eddy and become extremely turbulent. As such, second fluid flow regulator 10 should be placed at at least a location, such that at the time fluid 2 encounters second fluid flow regulator 10-b it is reattached and re-energized. At such an optimal location, fluid 2 may then pass over second fluid flow regulator 10-b with the same results as discussed above as it passed over first fluid flow regulator 10-a. This continuous "touch and go" phenomenon may be repeated as often as necessary until fluid 2 is in its maximized optimal state of attached flow. By providing multiple fluid flow regulators, the flow of fluid 2 may be said to be "pulsed," or rather internal flow device 12 comprises pulsed fluid flow caused by the sudden and multiple pressure recovery drops.

As fluid 2 travels about surface 14 of internal flow device 12 it possesses identifiable or quantifiable characteristics and parameters with regards to its velocity, drag ratio, pressure, density, viscosity, and others. These are largely determined by the existing environmental conditions, as well as the particular design parameters and characteristics of the device and its surface, such as shape, size, texture, and other aerodynamic or design factors. Thus, as fluid 2 flows about surface 14, these parameters are defined. However, at the same time they are continuously changing as dictated by the same factors. Thus, fluid 2 will possess certain characteristics, properties, and behavior just prior to its introduction about surface 14. Once introduced into device 12, fluid 2 will undergo many influencing forces as it passes through device 12. These influencing forces will, among other things, disrupt the equilibrium of the fluid, induce pressure differentials or gradients, and cause fluid separation; and all along surface 14, fluid 2 will try to compensate and stabilize or equalize itself.

During this transitional period from the time a fluid exists prior to introduction into an internal flow device, to the time the fluid passes over surface, to the time the fluid exists the internal flow device, has been the focus of years of study and experimentation. As discussed above, significant strides in these areas have been made, but serious problems associated with boundary layers, fluid separation, pressure equilibrium, drag, and turbulent vs. laminar flow still remain.

The present invention functions to significantly improve fluid flow within an internal flow device or system and to eliminate the problems of prior art devices or systems. Although not all properties, functions, characteristics, parameters, relationships, and effects are entirely understood, the present invention seeks to set forth a unique way of influencing the behavior of fluid within a closed or semi-closed structure and environment.

In the present invention, as fluid 2 enters internal flow device 12 and flows about surface 14 it is disrupted, or further disrupted, from its current existing state. Most likely, due to several factors, the fluid will become more turbulent as the molecules of the fluid interact with and pass over the molecules of surface 14. An increase of turbulence typically means an increase of pressure drag leading to a decrease in velocity of the fluid, as well as an increase in the density and viscosity of the fluid. However, the present invention is designed to reduce this disruption, and thus the turbulence, of the fluid by reducing the overall pressure drag and friction drag. Reducing each of these will significantly increase the pressure recovery potential of the surface, which will, in turn, increase the attachment potential of the fluid (or decrease the potential for separation of the fluid). Increasing the attachment potential functions to create a much more laminar and efficient flow of fluid 2 about surface 14.

To accomplish the functions just described, and to explain the touch and go phenomenon in greater detail, internal flow device 12 features at least one, and preferably a plurality, of fluid flow regulators 10 as taught above. Thus, as fluid 2 flows about surface 14, it encounters and passes over fluid flow regulator 10, and particularly pressure recovery drop 26 positioned at an optimal pressure recovery point 34. At this precise point or location, there is a significant and immediate or sudden reduction in pressure or drop in pressure caused or induced by fluid flow regulator 10, and particularly pressure recovery drop 26, such that fluid 2 essentially drops over or falls off of pressure recovery drop 26, which results in a significant reduction in pressure drag. This sudden drop in pressure creates a sub-atmospheric barrier or shield 38 directly at the base of pressure recovery drop 26. Sub-atmospheric barrier 38 is a low pressure area that essentially creates a barrier or cushion between surface 14 and fluid 2, thus providing like molecules on like molecules to improve flow of fluid 2. This barrier is created and exists directly adjacent drop face 30 where it is the strongest. The farther away from pressure recovery drop 26 along surface 14, the magnitude or influence of barrier 38 decreases as is illustrated by the tapering off of barrier 38 as the distance from pressure recovery drop 26 increases. Essentially what is happening is that the sudden drop in pressure that occurs at pressure recovery drop 26 is the greatest, thus creating the strongest barrier. As the distance away from pressure recovery drop 26 increases in the direction of fluid flow, the pressure on surface 14 begins to increase and sub-atmospheric barrier 38 begins to dissipate or diminish. At the instance of sudden pressure drop, the pressure coefficient (a non-dimensional form of the pressure defined as the difference of the free stream and local static pressures all divided by the dynamic pressure) at the base of drop face 30 is increased. As stated, sub-atmospheric barrier 38 is a low or reduced pressure area. It's function or effect is to decrease the molecular activity occurring between the molecules at surface 14, the boundary layer, and those existing within the free stream of fluid 2. This reduction in molecular activity may be described as a reduction in the kinetic energy of the molecules, which kinetic energy increases the tendency of the molecules present within fluid 2 to adhere or stick to surface 14, a phenomenon commonly referred to as skin friction drag, surface viscosity, or friction drag. These forces are directly related to the surface texture, the molecular movement and interaction at the surface of an object, as well as the magnitude of turbulence experienced by the fluid within internal flow device 12.

As stated, sub-atmospheric barrier 38 comprises a low pressure area of fluid molecules possessing decreased kinetic energy. The decrease in kinetic energy is a result of the sudden drop in pressure induced at or by pressure recovery drop 26. These low energy molecules effectively provide a barrier between the higher or more energetic molecules in the free stream of fluid and the molecules of the surface. Stated another way, sub-atmospheric barrier 38 functions to cushion the more energetic molecules in the free stream from the molecules in the surface of the device. What results is a much for laminar flow and an increase in attachment potential, or decrease in separation potential because the fluid is in a greater state of equilibrium.

The present invention fluid flow regulator 10 may also be termed a surface pressure gradient regulator because of its ability to regulate or control or influence pressure gradients within internal flow device 12, as well as pressure drag and pressure recovery about surface 14. The ability to regulate pressure drag stems from the sudden pressure drop at the optimal pressure recovery point 34. It is a well know fact that a fluid will follow the path of least resistance. The pressure gradient regulator allows us to regulate the pressure fields at the boundary layer of any said surface. This manipulation of pressures will allow us to manipulate the flow field of a fluid in motion around an object. The ability to regulate pressure drag stems from the sudden pressure drop at the optimal pressure recovery point 34, which pressure drop induces or creates a sub-atmospheric barrier 38 that functions to improve the flow of a fluid across surface 14 of object 12.

Figure 3:
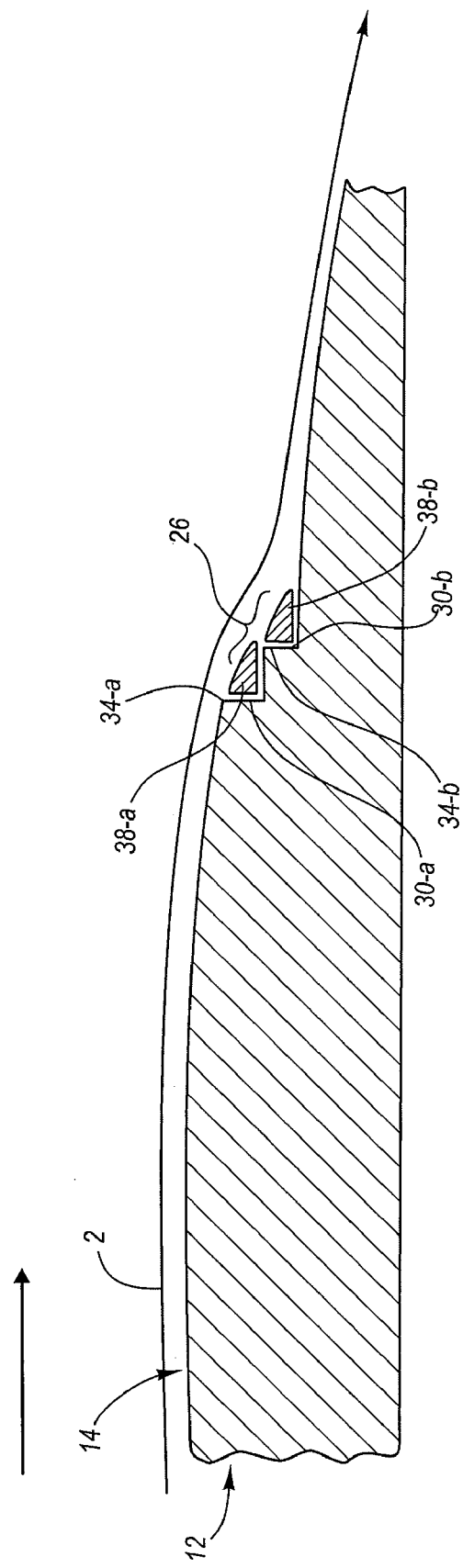
FIG. 3 illustrates a side cross-sectional view of an internal flow device having a surface and one or more fluid flow regulators featured therein, wherein the fluid flow regulator comprises a pressure recovery drop having a plurality of drop faces.

FIG. 3 illustrates a side cross-sectional view of internal flow device 12 having a surface 14 and featuring one or more fluid flow regulators 10, wherein said fluid flow regulator 10 comprises a pressure recovery drop 26 having a plurality of drop faces therein, shown as drop faces 30-*a* and 30-*b*. In this embodiment, fluid flow regulator 10 induces multiple pressure drops creating sub-atmospheric barriers 38-*a* and 38-*b*, which each function to optimize fluid flow. Specifically, as fluid 2 encounters pressure recovery drop 26, it becomes subject to drop face 30-*a* and a sudden pressure drop is induced, thus generating sub-atmospheric barrier 38-*a*. Immediately following drop face 30-*a* is drop face 30-*b*. Thus, fluid 2 immediately encounters drop face 30-*b* and induces a second sudden or immediate pressure drop, thus generating second sub-atmospheric barrier 38-*b*. The advantage of building in a plurality of drop faces 30 into pressure recovery drop 26 is that fluid 2 is influenced to an even greater degree, with all of the effects discussed herein magnified. This effect does not obviate the discussion above discussing the location of a second fluid flow regulator because the second drop face 30-*b* is contained within a single pressure recovery drop 26 and exists prior to the "go" of the fluid in the touch and go sequence presented above.

Fluid flow regulator 10 and it associated method provides the ability to achieve the greatest state or equalization and/or harmony between the molecules in fluid 2 and surface 14 of internal flow device 12. Equalization or harmony between fluid and surface molecules is increased significantly as fluid 2 and the molecules directly adjacent surface 14 (those in the boundary layer) interact less violently as a result of sub-atmospheric barrier or shield 38 created by fluid flow regulator 10.

When fluid flows through an internal flow device, the fluid becomes subject to, among other things, pressure drag and friction drag. Each of these decrease the efficiency of fluid flow, as well as cause the fluid to flow more turbulent than laminar. Indeed, the less pressure drag and friction drag that is induced about the surface the more laminar the flow across that surface will be. Just the opposite is also true. The greater the pressure drag and friction drag induced about the surface, the more turbulent the flow across the surface will be.

A smooth or semi-smooth surface exhibits a significant amount of pressure drag. As the fluid progressively passes over the smooth surface, the fluid, or rather the molecules within the, react with the molecules of the surface, such that a significant amount of surface friction is induced, known as friction drag. The further along the surface the fluid travels, the greater the disturbance in flow that is caused by this friction drag. This has the effect of increasing the pressure along the surface. In other words, there is an upward pressure distribution along the surface caused by the friction created between the molecules in the fluid and the molecules in the surface. In addition, as the fluid progresses across the surface, the fluid begins to detach. This detachment is commonly referred to as separation. Friction leads to separation and separation leads to an increase in turbulence of fluid flow. Thus, in a streamlined surface a significant amount of initial pressure drag, friction drag, and final pressure drag exist (compared to a surface feature one or more fluid flow regulators), each of which will cause the fluid to separate and exhibit a greater amount of turbulence across surface and within the internal flow device In comparison, a surface featuring a fluid flow regulator placed at an optimal pressure recovery point functions to recover pressure as the fluid passes over the pressure recovery drop. The pressure recovery drop induces a sudden drop in pressure, thus functioning as a pressure recovery mechanism. By incorporating a fluid flow regulator into an internal flow device, several effects result, including the lowering or reducing of forward pressure drag, friction drag, and tail pressure drag, thus signaling powerful pressure recovery capabilities of the fluid flow regulator of the present invention. Moreover, it can be seen that forward and tail pressure drag are more equal than the same pressure drags found about an internal flow device comprising a streamlined surface. Equalization of these two opposing pressure drags is a direct result of the pressure recovery that takes place at the location of the fluid flow regulator. From this it can be seen that a fluid flow regulator significantly influences the behavior of the fluid within the internal flow device. This effect may lead to significant design changes in both form and function of internal fluid flow devices, one of which is provided below in the form of a modified venturi.

Depending upon the length of the surface or various other design considerations and dynamic forces, it may be necessary to employ multiple fluid flow regulators. For example, if a fluid still comprises an adverse pressure gradient after passing a first fluid flow regulator the fluid may begin to separate from the surface. As such, the presence of this residual adverse pressure gradient and potential for fluid separation warrant placement of another fluid flow regulator at a calculated second optimal pressure recovery point. In essence, multiple fluid flow regulators may be utilized to carry out the intended function of recovering pressure and maintaining attached, laminar flow of the fluid through the entire enclosed or semi-enclosed device or system.

Figure 4:
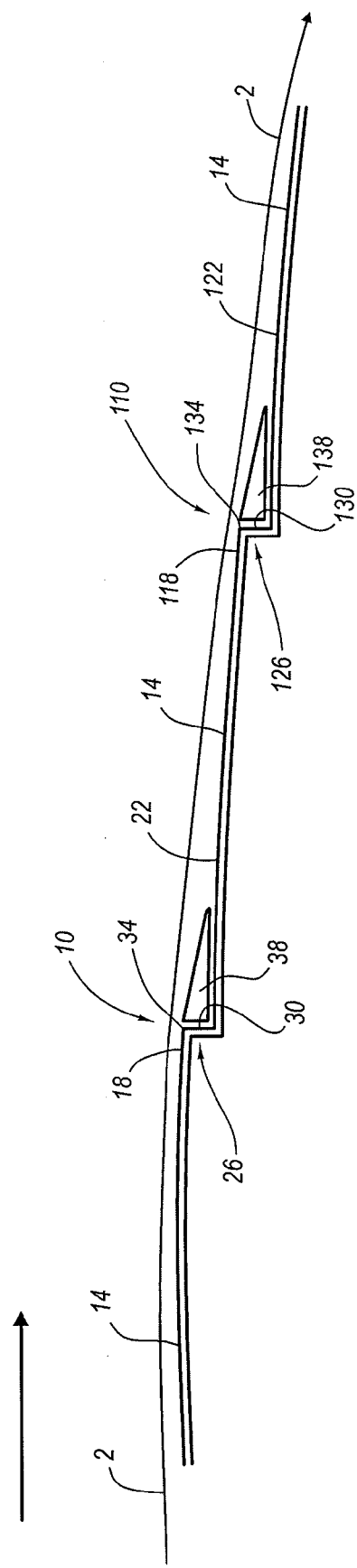
FIG. 4 illustrates a side cross-sectional view of a plurality of fluid flow regulators situated along the surface of an internal flow device and the direction of airflow with respect to the fluid flow regulators.
Figure 5:
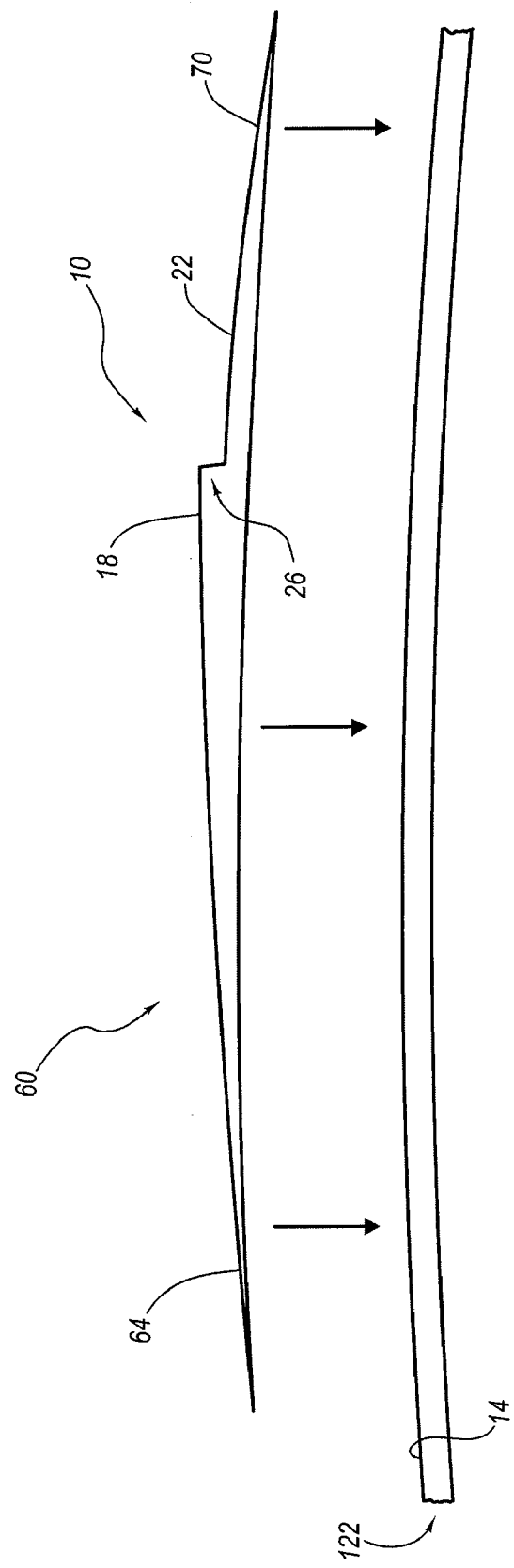
FIG. 5 illustrates a side cross-sectional view of a removable or detachable fluid flow regulator device capable of attaching or adhering to a surface to provide one or more fluid flow regulators thereon.

FIG. 4 illustrates an embodiment comprising an internal flow device 12 having first fluid flow regulator 10 and second fluid flow regulator 110 integrally formed within its surface 14. First and second fluid flow regulators 10 and 110 function similarly, only second fluid flow regulator 110 is located at a second optimal pressure recovery point 134 and comprises leading edge 118 leading into pressure recovery drop 126, and trailing edge 122 extending away from pressure recovery drop 126. Second optimal pressure recovery point 134 exists at a location farther than the point of reattachment of fluid 2 after leaving first fluid flow regulator 10 and at a location where an adverse pressure gradient exists. Thus, fluid 2 encounters second fluid flow regulator 110, which induces a sudden pressure drop at pressure recovery drop 126, which in turn creates second sub-atmospheric barrier 138 over which fluid 2 passes in an increased laminar state. As such, multiple fluid flow regulators function to maintain the laminar flow characteristics of fluid 2 over the entire length of surface 14. As stated, a plurality of fluid flow regulators may be utilized as necessary.

In one exemplary embodiment, fluid flow regulator 10 is integrally formed with and part of surface 14. As such, leading edge 18, pressure recovery drop 26, and trailing edge 22 are integrally formed with and part of surface 14. This arrangement represents the embodiments illustrated in FIGS. 1–4. Moreover, fluid flow regulator 10 preferably spans the length or width of surface 14, but may also be designed to extend only a limited distance across surface 14. In another exemplary embodiment, illustrated in FIG. 5, fluid flow regulator 10 may comprise a separate fluid control device 60 that removably attaches to an existing surface 14 within internal flow device 12. Fluid control device 60 5 illustrates fluid control device 60 as comprising an transition extension 64 that, when attached to surface 14, provides a smooth transition for fluid 2 as it travels across surface 14 onto fluid control device 60. Transition extension 64 comprises a gradual slope that extends up to and connects to leading edge 18. Leading edge 18 then transitions into pressure recovery drop 26 as discussed above. Fluid control device 60 further comprises a trailing edge 22 that transitions with another transition extension 70 that once again slopes downward toward surface 14 to provide a smooth transition for fluid 2 from fluid control device 60 to surface 14. Of course, if a transition from surface 14 to fluid control device 60 is unnecessary, fluid control device can be made to completely cover surface 14 so that fluid control device 60 becomes the surface of device 12. Either way, fluid control device 60 attaches to an existing surface 14 and essentially functions as a quasi surface over which fluid 2 flows. Fluid control device 60 may be attached to surface 14 using various attachment means, including adhesives, screws, snaps, hook and loop fastener, etc. Fluid control device 60 may also attach to surface 14 using some type of connection or joint, such as a slot or groove arrangement.

In addition to the contemplation of multiple fluid flow regulators, the present invention further contemplates differing heights between one or more fluid flow regulators along the same surface. Again referring to FIG. 4, second pressure recovery drop 126 may have a drop face 130 that comprises a different height than first pressure recovery drop 26 and associated drop face 30. As indicated above, the pressure gradients existing along a surface are different in degree or magnitudes. The degrees or magnitudes of these pressure gradients are also not static, but vary and fluctuate through a range during the time the fluid is flowing over the surface of the object, according to and as a result of several known factors. To account for these varying and changing or fluctuating pressure gradients, the height of each drop face on each pressure recovery drop can be designed to effectively recovery the most pressure. The height of each drop face will largely be dependent upon the amount of pressure recovery needed at a particular pressure gradient to achieve optimal fluid flow over the surface at that particular location and instance. In one embodiment, subsequent pressure recovery drops will most likely comprise shorter drop faces than their preceding counterparts as much of the adverse pressure in the fluid will be reconciled by the initial pressure recovery drop. Therefore, a less drastic reduction in pressure or less pressure recovery will be required at subsequent pressure recovery drops to continue or maintain the optimal fluid flow. Or, the pressure gradient across the surface will be controlled by successive fluid flow regulators having different heights so that pressure, and therefore separation, is kept to a minimum, or within acceptable or desired levels.

The present invention also contemplates that one or more fluid flow regulator(s) may comprise different orientation arrangements about a surface, or that a fluid flow regulator may be arranged at any angle to fluid flow, although perpendicular or substantially perpendicular is preferred, depending largely upon the direction of fluid flow, the shape of the internal flow device, the function of the device, the type of fluid, and any others recognized by one of ordinary skill in the art.

Figure 6:
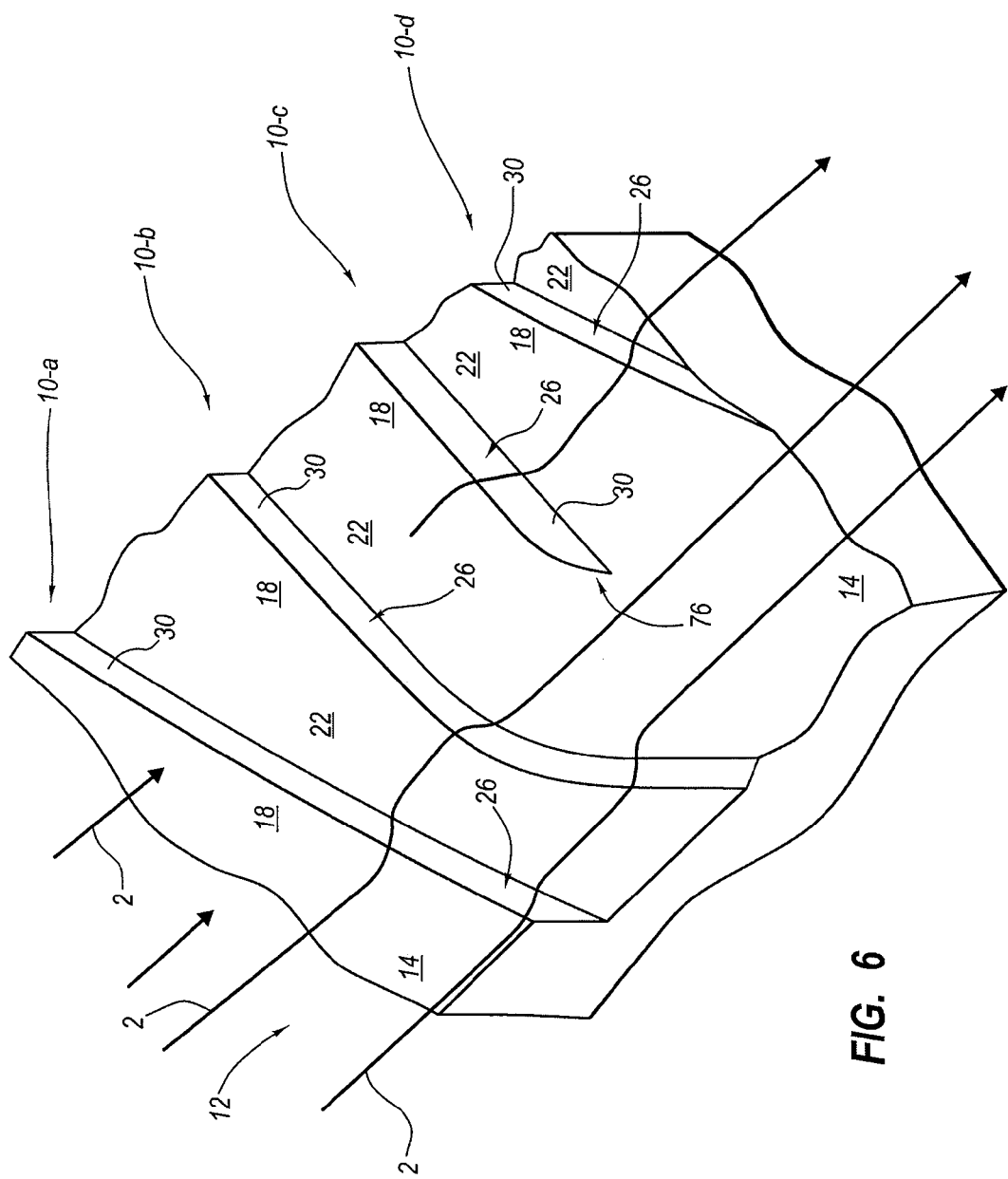
FIG. 6 illustrates an isometric cut away view of a surface having a plurality of fluid flow regulators thereon arranged to illustrate the several different orientations the fluid flow regulators may be oriented with respect to the fluid flow.

Referring now to FIG. 6, shown is a segment of internal flow device 12 comprising a surface 14, wherein surface 14 comprises or features a plurality of fluid flow regulators 10, shown as fluid flow regulators 10-a, 10-b, 10-c, and 10-d, each comprising a leading edge 18, a trailing edge 22, a pressure recovery drop 26, and a drop face 30. As can be seen, one or more fluid flow regulators 10 may be placed on a single surface 14, as desired. In addition, fluid flow regulators 10 may comprise any size, length, shape, curvature, etc. Still further, fluid flow regulators 10 may comprise different drop face heights. And, still further, fluid flow regulators 10 may be arranged or oriented as required or desired to induce and maintain optimal fluid flow across surface 14. Typical orientations include fluid flow regulators that are perpendicular to fluid flow, that are on acute angles to fluid flow, that comprise one or more curved segments, etc. The foregoing is evident by fluid flow regulator 10-a comprising a linear design, yet is on an acute angle with respect to the direction of flow of fluid 2. Fluid flow regulator 10-b comprises a linear segment that transitions into a curved segment. Fluid flow regulator 10-c comprises a limited length that further comprises a blended end 76 that gradually blends into surface 14. Fluid flow regulator 10-d comprises a linear design similar to fluid flow regulator 10-a, but further comprises shorter or lower profile drop face 30. FIG. 6 illustrates several possible configurations, namely sizes, shapes, and orientations, that fluid flow regulators may comprise over a single surface. However, these are not meant to be limiting in any way. Indeed, engineering design parameters, environmental conditions, and other factors will lead one ordinarily skilled in the fluid dynamics art to conclude or recognize other potential configurations, as well as the most optimal orientation for a particular use. The present invention, although impossible to recite, contemplates each of these and each is intended to fall within the scope of the description and claims presented herein.

Fluid flow regulators may be integrally formed within the surface of an object, or attached via a removable attachment device, as discussed above. Essentially, no matter how fluid flow regulators are related to or incorporated into the surface of an object, either integrally formed, part of a removable device, cut-out of the surface, etc., the term "featured" as used herein and in the claims is meant to cover each of these.

In another embodiment, fluid flow regulators may comprise a mechanism or system comprising individually operating, yet interrelated component parts that function to provide or create one or more fluid flow regulators in a surface, wherein the fluid flow regulators are dynamically adjusted or adjustable. Because a fluid flowing through an internal flow device experiences a number of different and changing or varying influencing forces or environmental conditions that result in varying surface and fluid flow characteristics, such as pressure gradients along or across its surface, it follows that an adjusting or adjustable fluid flow regulator would be advantageous to maintain optimal fluid flow during the entire time the fluid is within the device and to account for these varying or changing conditions, thus allowing the fluid to achieve its truly most optimal flow potential about the surface within the device. Thus, the present invention features a dynamic or adjustable fluid flow regulator capable of altering its physical characteristics, location, and/or existence altogether, as well as compensating for varying fluid flow conditions. Any of the component parts of the fluid flow regulator may be designed to move or adjust to vary the height of drop face and pressure recovery drop, such as designing the leading edge, the pressure recovery drop, and/or the trailing edge to comprise the ability to adjust to vary the height of pressure recovery drop. In addition, the surface of the device may comprise one or more elements or components that are utilized in conjunction with the fluid flow regulator to vary the height of the drop face. In essence, the present invention contemplates any device, system, etc. that is capable of adjusting the pressure recovery drop on demand an in response to varying situations or conditions. The dynamic fluid flow regulator may be actuated, or designed to oscillate in response to changing conditions.

With reference to FIG. 7-A, shown is one exemplary embodiment of a dynamic fluid flow regulator. Specifically, internal flow device 12 is shown comprising a surface 14 having a recess 80-a and a recess 80-b, each created in surface 14. Recess 80-a comprises a cut-away portion of device 12, such that pressure recovery drop 26, and particularly drop face 30 is created therein. Recess 80 specifically comprises a horizontal surface 14-a that is integrally formed with and part of surface 14 of device 12, and a vertical surface 30-a that functions as pressure recovery drop 26 and drop face 30. Recess 80-b comprises a cut-away portion of object 12, such that pressure recovery drop 26, and particularly drop face 30 is created therein. Recess 80 specifically comprises a horizontal surface 14-b that is integrally formed with and part of surface 14 of device 12, and a vertical surface 30-b that functions as pressure recovery drop 26 and drop face 30. To create dynamic fluid flow regulator 10, rotatably attached to object 12 at a distal location from drop face 30, using one or more attachment means, is an adjustable plane 82. Adjustable plane 82 comprises a surface that closely fits and interacts with pressure recovery drop 26, and that adjusts on demand to vary the height of drop face 30. Thus, variations in pressure drag, friction drag, velocity, fluid viscosity and other factors or conditions that occur and develop as fluid 2 flows over device 12 can be monitored and compensated for simply by actuating adjustable plane 82, which subsequently alters the height of drop face 30 and pressure recovery drop 26, as needed. Monitoring devices common in the industry may be used to monitor the conditions and characteristics of both the fluid flow and the internal flow device.

Dynamic fluid flow regulator 10, and particularly adjustable plane 82, may also be designed to comprise transverse movement that allows adjustable plane 82 to move bi-directionally in a horizontal manner to preserve a tight relationship between end 86 and drop face 30 and to ensure drop face 30 is perpendicular to surface 14. In addition, end 86 preferably seals tightly against drop face 30 at all times and at all vertical positions.

Moreover, the present invention fluid flow regulator(s) may be designed so that the position or location of the fluid flow regulators altogether may be selectively altered. This embodiment is contemplated because the optimal pressure recovery point(s) along a surface may not always be in the same location. For example, faster fluid velocities, different altitudes, varying pressures, and other forces, may cause optimal pressure recovery points to vary along the surface. As such, the dynamic fluid flow regulators may be designed to comprise the ability to undergo selective vector movement, meaning that they may be moved or repositioned in any direction along the surface to once again be in alignment with an optimal pressure recovery point.

In operation, dynamic fluid flow regulator 10 functions to regulate varying pressure gradients across surface 14 by continuously altering the potential pressure recovery at one or more optimal pressure recovery points 34. Continuously altering the potential pressure recovery involves monitoring the pressure gradients acting upon the surface to determine whether these pressure gradients are strong enough to induce separation of the fluid from the boundary layer created along surface 14 from the flow of fluid. Monitoring devices and/or systems commonly known in the art for monitoring pressure and friction drag and fluid separation would be able to indicate whether there was a need for actuation of dynamic fluid flow regulator 10 to recover pressure and maintain the attachment of the fluid in a laminar, optimal flow at that point or location on surface 14. As fluid flows about surface 14, dynamic fluid flow regulators 10 would be placed at those locations most likely to experience separation. However, often pressure gradients along a surface exhibit significant pressure differentials. Utilizing dynamic fluid flow regulator provides the means for compensating for these differentials. For instance, in a controlled environment, if a fluid is flowing through a device at a constant rate, the flow is easily predicted and the determination of the number, placement, and design of fluid flow regulators is simple. However, as conditions change, either with respect to the fluid or the object, it may become necessary to modify or change the design, placement, or number of fluid flow regulators to compensate for the change and maintain separation and optimal fluid flow. This is even more true in an uncontrolled, natural environment. As such, dynamic fluid flow regulators serve such a purpose. For a set of given conditions, adjusting plane 82 may be set so that pressure recovery drop 26 comprises a pre-identified drop face height. This height is calculate to provide the necessary amount of pressure recovery at that point to prevent separation and maintain laminar fluid flow. As conditions change, adjusting plane 82 may be adjusted up or down as indicated by the arrows to increase or decrease the height of drop face 30. Adjusting plane 82 is adjusted by rotating attachment means 84 connecting adjusting plane 82 to device 12. Thus, if the pressure drag and friction drag at that point increase, separation may result if pressure recovery drop 26 is fixed at its original position. To overcome separation and maintain optimal fluid flow, adjusting plane 82 is actuated to lower, and therefore, increase the distance or height of drop face 30, which has the effect of creating a greater drop in pressure leading to increased pressure recovery. The degree adjusting plane 82 is adjusted is a calculated determination to be made considering all known and relevant factors.

Adjusting plane 82 may also move horizontally back and forth as needed. Horizontal movement may be necessary to keep the travel of end 86 as linear as possible, and as close to drop face 30 as possible, especially if the distance adjusting plane 82 is required to travel is substantial. If adjusting plane 82 is not allowed to move horizontally, end 86 would travel along an arc and would separate from drop face 30 at some point, thus frustrating the intended function and effects of fluid flow regulator 10.

FIG. 7-B illustrates another exemplary embodiment of a dynamic fluid flow regulator. In this embodiment, dynamic fluid flow regulator 10 also comprises an adjusting plane 90. However, in this embodiment, adjusting plane 90 moves vertically up and down as needed to adjust pressure recovery drop 26 and drop face 30. Adjusting plane 90 is caused to move up and down by actuating one or more lifts 98. Although the mechanism illustrated in FIG. 7-B is different than that shown in FIG. 7-A, the function and effect is the same. Essentially, pressure recovery drop 26 and drop face 30 is allowed to increase or decrease in response to changing or varying fluid flow conditions for the purpose of inducing the proper amount of pressure recovery along surface 14 to ensure optimal fluid flow.

Although not illustrated, the present invention further features a fluid flow regulator that may be adjustably or selectively positioned along surface 14. Often during fluid flow, due to many contributing factors, the point along surface 14 at which separation begins will vary in location. As such, it becomes necessary to be able to identify each of these optimal pressure recovery points 34 and to place a fluid flow regulator at that point. Allowing fluid flow regulators to be selectively positioned along surface 14 greatly increases the potential for proper and optimal pressure recovery and for reducing flow separation.

It should be noted that the present invention contemplates any type of system, device, etc. that is capable of adjusting or modifying the design characteristics of fluid flow regulators to regulate the pressure gradients about a surface. Although in the preferred embodiments recited herein these modifications are facilitated by providing one or more dynamic fluid flow separators, these embodiments are only exemplary and not intended to be limiting in any way. Indeed, one ordinarily skilled in the art will recognize other designs that carry out the intended function of the present invention.

The present invention fluid flow regulators, and the surfaces on which these are utilized, offer many significant advantages over prior art surfaces and fluid flow regulating devices or systems. Although several advantages are specifically recited and set forth herein, fluid dynamics is an extremely broad field with many properties still largely misunderstood or unknown, thus making it impossible to identify, describe, and feature all of the possible effects and advantages of the present invention. As such, the intention of the present application is to provide an initial starting point for many extensive and ongoing experiments and studies by all interested. As such, the present invention provides several significant advantages.

First, the fluid flow regulators provide the ability to induce pressure drops on demand. These pressure drops allow the fluid flow regulators to regulate pressure gradients about the surfaces of the devices in which they are utilized. This is significant because the ability to regulate pressure gradients provides the ability to influence, control, and optimize fluid flow about the surface and to reduce the separation and/or separation potential of the fluid. Moreover, the ability to regulate pressure gradients is provided on an as needed basis, meaning that the magnitude of pressure recovery induced can be controlled by varying the physical location and characteristics of the fluid flow regulators.

Second, the fluid flow regulators provide increased and less volatile molecule interaction between the molecules in the fluid and the molecules in the surface. This is largely accomplished by the generation of a sub-atmospheric barrier of low pressure that acts as a cushion between each of these molecules. As such, the boundary layer between the surface and the most adjacent or proximate fluid flow stream is preserved even in stressful or high pressure drag situations.

Third, flow separation is essentially eliminated across any surface. At each precise point along a surface where flow begins to separate, a fluid flow regulator is placed, thus functioning to induce a sudden pressure drop at that point. This sudden drop in pressure performs the necessary influence on pressure drag and friction drag to effectuate the most appropriate pressure recovery that forces the fluid to remain attached to the surface, and to maintain an optimal flow pattern.

Fourth, fluid flow regulators provide the ability to significantly influence pressure drag by reducing pressure drag at various locations along the surface. Reducing the pressure drag in turn increases pressure recovery, which subsequently lowers the friction drag along the surface. By reducing or lowering friction drag, the potential for fluid separation is decreased, or in other words, attachment potential of the fluid is significantly increased.

Fifth, pressure drag forward and aft a surface is reduced. Moreover, these pressure drags are more likely to be equalized, or these pressure drags are more likely to achieve a state of equilibrium at a much quicker rate.

Sixth, dynamic fluid flow regulators provide the ability to compensate for changing or varying conditions, either environmental, within the flow, or within the object itself, by facilitating the most accurate and strategic pressure drops possible across the surface.

Seventh, the potential and kinetic energy of molecules is more efficiently utilized and accounted for.

Eighth, a surface featuring one or more fluid flow regulators functions to improve the overall efficiency of the internal flow device in which it is being utilized. By influencing the flow to obtain the most optimal flow state, the internal flow device is able to increase its output in terms of volume of fluid and fluid velocity using the same amount of input power.

Ninth, fluid flow regulators significantly reduce noise produced by fluid flowing about the surface of the object.

Noise is reduced due to the flow properties being made optimal as compared to streamlined surfaces. Noise reduction can be a significant problem in many fields and applications, such as in the design and operation of jet engines.

These advantages are not meant to be limiting in any way as one ordinarily skilled in the art will recognize other advantages and benefits not specifically recited herein.

Fluid flow regulator 10 may be applied to or formed with any type of enclosed or semi-enclosed structure or device experiencing internal flow therein. It is impossible to recite and describe the numerous possible designs and applications to which the present invention may be present within or applied to. As such, it is contemplated that the present invention will be applicable to any internal fluid flow device and/or system.

The present invention further features a method for influencing internal fluid flow within an internal flow device and for influencing the rate and magnitude of pressure recovery within the device. This method comprises the steps of: featuring at least one fluid flow regulator with one or more surfaces of an internal fluid flow device, wherein the fluid flow regulator comprises a pressure recovery drop having at least one drop face formed therein, and wherein the drop face comprises a calculated height; directing a fluid through the internal flow device; and causing the fluid to encounter the fluid flow regulator, such that the pressure recovery drop induces a sudden drop in pressure as the fluid flows over the fluid flow regulator, wherein a sub-atmospheric barrier is created at the base of the drop face. As such, the fluid flow regulator functions to optimize fluid flow within the object, thus increasing the performance of the internal flow device.

The present invention further features a method for controlling the flow of fluid within an internal flow device or system. The method comprises the steps of: obtaining an internal fluid flow system capable of receiving fluid flow therein, the device having one or more fluid bearing surfaces about which a fluid may flow; featuring one or more fluid flow regulators as part of the fluid bearing surfaces, wherein the fluid flow regulator optimizes fluid flow and the performance of the internal flow device; directing the fluid into the internal fluid flow device; and causing the fluid to flow about within the internal flow device so that the fluid encounters the one or more fluid flow regulators.

Moreover, the present invention features a fluid control system comprising an internal flow device having at least one surface subjected to a fluid; and a fluid flow regulator featured and operable with the surface, wherein the fluid flow regulator comprises the elements and functions of the elements as described herein.

Although the present invention is applicable to any closed or semi-closed internal flow device or system, the present invention focuses on two primary systems, devices, or applications, namely nozzles, conduits, venturi-like devices, and jet engine exhaust systems. Each of these is discussed individually below.

Exemplary Internal Flow Devices and Systems

Figure 8:
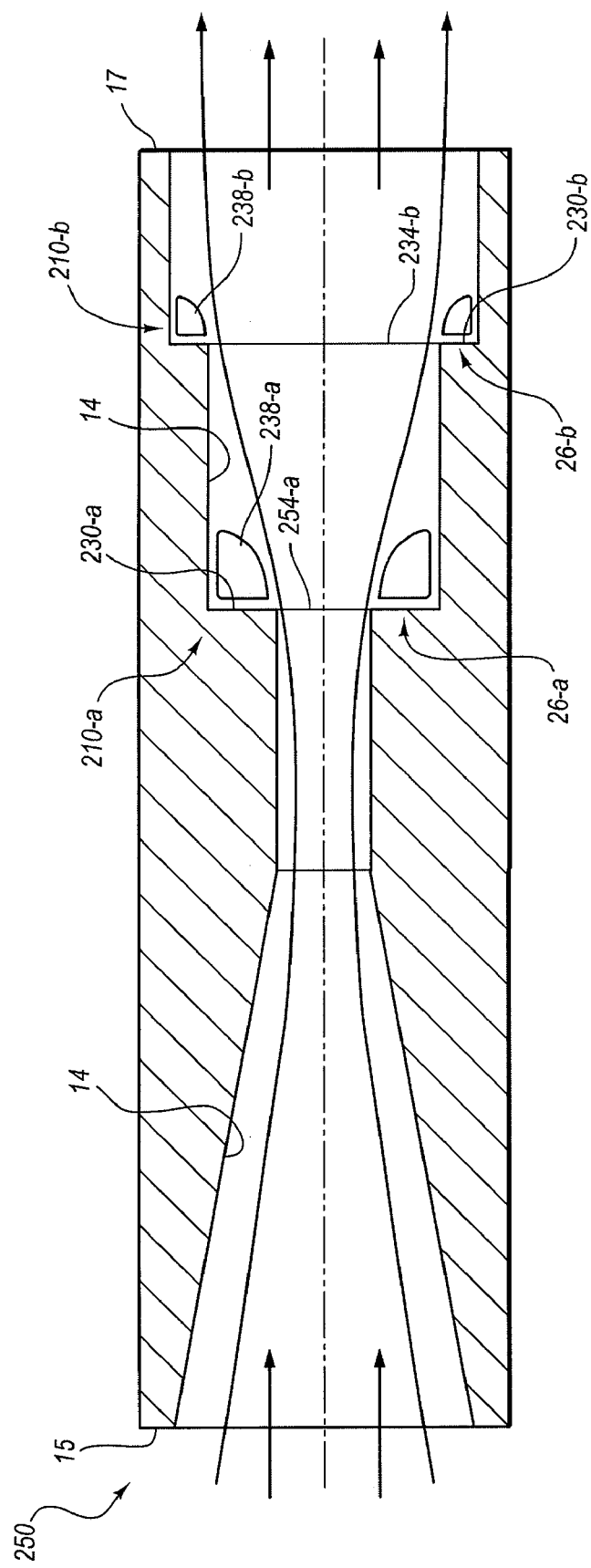
FIG. 8 illustrates an exemplary internal flow device in a closed environment in the form of a Dargan nozzle comprising or featuring a plurality of fluid flow regulators according to one exemplary embodiment of the present invention.

FIG. 8 illustrates an exemplary enclosed internal flow device that may is identified herein as a Dargan nozzle 250. This Dargan nozzle is similar in form to a venturi nozzle, at least partially, but comprises or features one or more fluid flow regulators 210 annularly positioned about its surface or interior 14 oriented perpendicular to flow of fluid 2 that allows Dargan nozzle 250 to significantly outperform a venturi nozzle. Specifically, Dargan nozzle 250 comprises fluid flow regulators 210-a and 210-b positioned at optimal pressure recovery points 234-a and 234-b, respectively, wherein each fluid flow regulator 210-a and 210-b comprise pressure recovery drops 226-a and 226-b, respectively, having a drop face 230-a and 230-b, respectively, of an identified and pre-determined distance.

Dargan nozzle further comprises intake 15 formed similar to one side of a venturi. However, as fluid 2 (e.g. fuel, water, air, etc.) continues through Dargan nozzle 250 it encounters first or primary fluid flow regulator 210-a. Fluid flow regulator 210-a functions as discussed above to regulate the flow of fluid 2 by regulating the pressure gradient(s) in fluid 2 by inducing a sudden pressure drop that generates sub-atmospheric barrier 238-a overwhich fluid 2 passes. First fluid flow regulator 210-a reduces pressure drag and friction drag and increase the attachment potential of fluid 2. Although a single fluid flow regulator may be sufficient to achieve attached flow about surface 14 through and continuing on past Dargan nozzle 250, an identified magnitude of adverse pressure may still remain. As such, once fluid 2 re-attaches past first fluid flow regulator 210-a, it encounters second fluid flow regulator 210-b. Fluid flow regulator 210-b, and particularly pressure recovery drop 226-b and drop face 230-b may comprise any drop distance. However, as shown, second fluid flow regulator 210-b will comprise a shorter drop face distance because much of the adverse pressure in the system will be dissipated and equalized by first fluid flow regulator 210-a. However, any adverse pressure remaining is designed to be regulated by subsequent fluid flow regulators, and in this case by fluid flow regulator 210-b. Once all adverse pressures have been minimized or eliminated, fluid 2 flows in a laminar attached manner about surface 14 within Dargan nozzle 250. Of course, one ordinarily skilled in the art will recognize additional fluid flow regulators may be utilized as required. In addition, the design configuration illustrated and described herein is provided merely as one exemplary design. Other designs are possible and contemplated herein.

Figure 9:
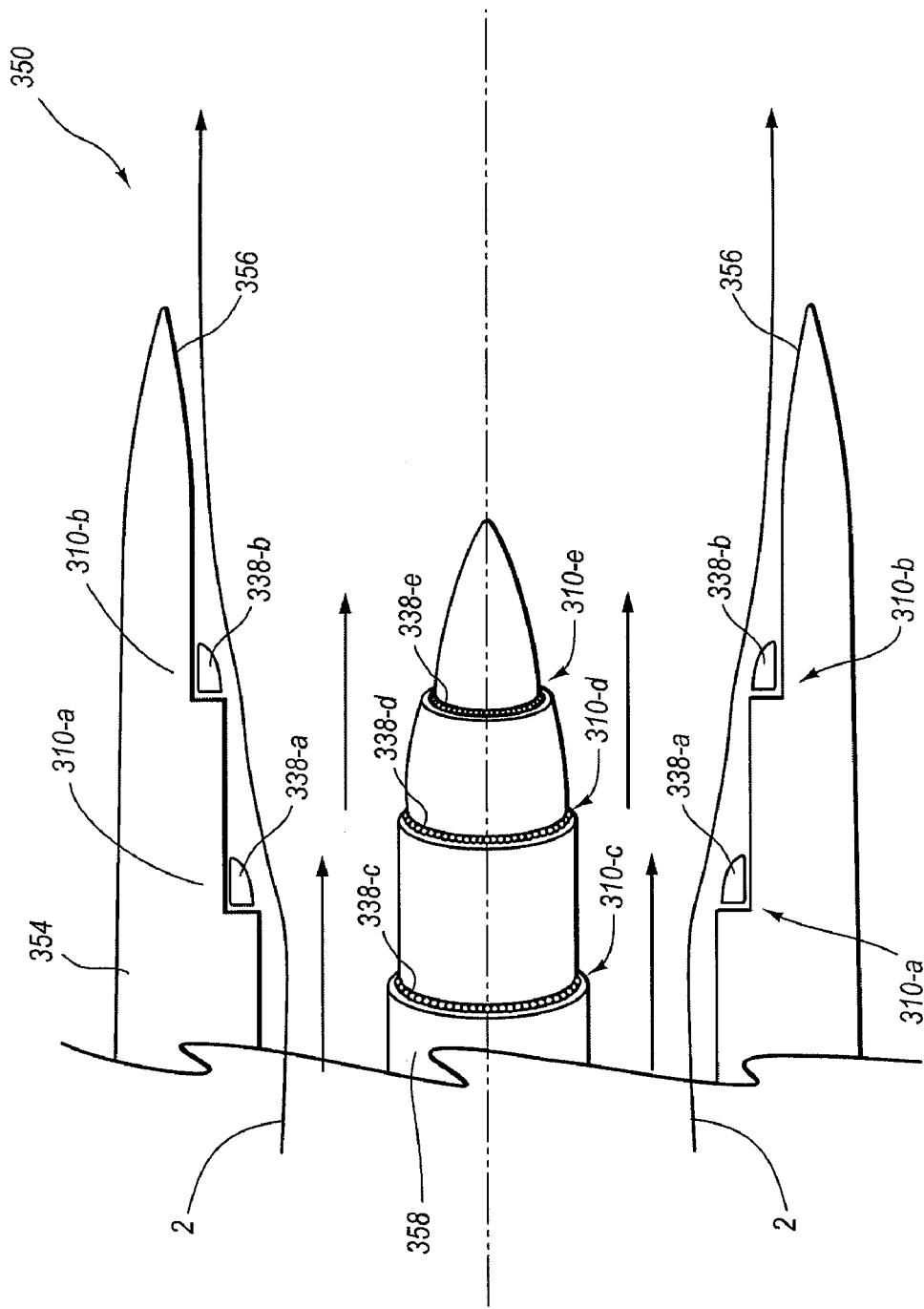
FIG. 9 illustrates an exemplary internal flow system in a semi-enclosed environment in the form of a gas turbine jet engine exhaust nozzle, wherein the exhaust nozzle features and comprises a plurality of fluid flow regulators on the component parts of the nozzle according to one exemplary embodiment of the present invention.

FIG. 9 illustrates a cross-section of a semi-enclosed internal flow device or system, namely an exhaust system 350 or exhaust nozzle utilized in or part of a gas turbine engine. Exhaust 350 is the exhaust duct of the gas turbine engine. Energy depleted airflow coming from a turbine, in addition to the colder air that bypassed the engine core, produces a force when exiting the nozzle that generates thrust to propel the engine and the airplane forward. Exhaust 350 comprises a housing 354 that houses and supports all of the engine components and a nozzle 358 that extends from a turbine (not shown). As can be seen, the various component parts of exhaust 350 each comprise or feature at least one fluid flow regulator 310. Specifically, housing 354 comprises a plurality of fluid flow regulators 310-a and 310-b that are positioned annularly around the interior surface 356 of housing 354. The portion of housing 354 adjacent or part of exhaust 350 functions to diffuse the flow of air 2 coming from the turbine.

Nozzle 358 also extends from the turbine and also functions to diffuse the flow of air 2. As such, nozzle 358 comprises or features a plurality of fluid flow regulators 310-c, 310-d, and 310-e.

Each of fluid flow regulators 310 are placed at optimal pressure recovery points and function as described herein to regulate the pressure gradients about surface 356 and fluid 2 and to optimize the flow of fluid 2 about housing 354 and nozzle 358.

Applying a plurality of fluid flow regulators 210 and 310 to each of the internal flow devices/systems discussed above improves the efficiency of these devices/systems. For instance in the case of the Dargan nozzle 250, a much greater volume of fluid is able to pass through the interior of the Dargan nozzle and at a much greater rate as compared to a venturi nozzle because of the reduced pressure and friction drag forces that result from regulating the pressure gradients and other dynamic forces acting on the fluid. The pressures about the flow and the surface are equalized allowing the flow to achieve and maintain an attached state.

In the case of the gas turbine engine, the engine will perform better and will be much more efficient than prior art gas turbine engines utilizing a streamlined exhaust system. This is true because the addition of a plurality of fluid flow regulators featured in the exhaust system allow a greater volume of fluid to pass through the system at a significantly greater rate as compared to prior art exhaust systems. This in turn generates more thrust and propulsion, all with the same amount of input power to the engine. As such, input power may be reduced to achieve the same performance characteristics as prior art gas turbine engines. Of course, the exact number, position, and orientation of fluid flow regulators in each of these systems will be an intense analytical procedure requiring much experimentation.

Although the present invention sets forth two exemplary internal fluid flow devices and systems, these are provided merely examples of the several different internal flow devices and systems to which the present invention may apply. As such, these should not be considered limiting in any way.

An example of one experimental test is provided below, wherein the example serves to provide some initial test results of preliminary experiments conducted using the technology described herein.

EXAMPLE ONE

The purpose of this experiment was to illustrate the different flow patterns of a liquid fluid as it passes through a first cylindrical nozzle having a streamlined smooth surface, compared with the flow patterns of the same fluid as it passes through a second cylindrical nozzle featuring a plurality of fluid flow regulators (the "regulated nozzle").

In this experiment, a tub of water was obtained, wherein the tub comprised a drain at its bottom. Food coloring was added to the water to track the flow patterns as each nozzle was placed in the drain and the tub drained. In the case of the streamlined nozzle, the flow pattern was quite turbulent with large vortices forming in the water. This nozzle was tested several times, each with the same result.

On the other hand, when the same experiment was conducted with the regulated nozzle, the results were much different. The flow patter of the water when draining through the regulated nozzle produced a much tighter flow pattern with a significant reduction in the turbulence of the water, which also significantly reduced the size of the vortex generated by the nozzle. This tighter flow pattern results from or is experienced due to the presence of the several fluid flow regulators acting to regulate the pressure in the nozzle and optimize the fluid flow therethrough. As indicated above, these fluid flow regulators induce a sub-atmospheric barrier at the base of each drop face, thus resulting in much less turbulent flow or increased laminar flow across the interior surface of the nozzle.

In addition to more laminar flow, the drain times in the tub using the two nozzles were also significantly dissimilar. The regulated nozzle drained the tub about 3–5% faster than did the unregulated nozzle. This suggests that the regulated nozzle is a much more efficient design, even under atmospheric pressures. As such, the difference in efficiency may improve dramatically in a controlled fluid environment. However, ever 3–5% in atmospheric pressure is remarkable.

EXAMPLE TWO

This particular experiment comprised testing siphon gun having a removable nozzle. Two different nozzles were created, one having a fifteen degree streamlined exit and the other featuring a fluid flow regulator. The siphon gun performed much better with the regulated nozzle than the unregulated nozzle.

These two experiments illustrate that the present invention may be applicable to any internal fluid flow device or system, whether in an enclosed or semi-enclosed environment. In addition, these early tests indicate that fluid flow within an internal device or system may be improved.

The present invention further features a conduit comprising one or more fluid flow regulators. Or rather, the present invention further contemplates featuring one or more fluid flow regulators within an internal flow device in the form of a conduit. A conduit may be any enclosed or semi-enclosed structure in which fluid flows, such as a pipe.

The present invention still further comprises a fluid booster or flow enhancer that is contained within a conduit that functions to recharge the fluid and recondition the fluid to maintain previously attained laminar flow.

The present invention further features a method for influencing internal fluid flow within an internal flow device or system operating in a closed or semi-closed environment and for influencing the rate and magnitude of pressure recovery along the surface. This method comprises the steps of: featuring at least one fluid flow regulator with one or more surfaces of an internal flow device, wherein the fluid flow regulator comprises a pressure recovery drop having at least one drop face formed therein, and wherein the drop face comprises a calculated height; subjecting the device to a fluid, such that the fluid is caused to move about the device; and causing the fluid to encounter the fluid flow regulator, such that the pressure recovery drop induces a sudden drop in pressure as the fluid flows over the fluid flow regulator, wherein a sub-atmospheric barrier is created at the base of the drop face. As such, the fluid flow regulator functions to optimize internal fluid flow about the device, thus increasing the performance of the device.

The present invention further features a method for controlling the internal flow of fluid across an internal flow device's surface. The method comprises the steps of: obtaining an internal fluid flow device or system designed to receive fluid flow therein, the device having one or more fluid bearing surfaces over which a fluid may flow; featuring one or more fluid flow regulators as part of the fluid bearing surfaces, wherein the fluid flow regulator optimizes fluid flow and the performance of the device; subjecting the device to the fluid; and causing the fluid to flow within the device so that the fluid encounters the one or more fluid flow regulators.

It should be noted that the foregoing methods incorporate all of the features, functions, elements, and advantages discussed above and herein.

The present invention may be embodied in other specific forms without departing from its spirit or essential characteristics. In addition, the described embodiments are to be considered in all respects only as illustrative and not restrictive. As such, the scope of the invention is indicated by the appended claims, rather than by the foregoing description.

All changes which come within the meaning and range of equivalency of the claims are to be embraced within their scope.

What is claimed and desired to be secured by Letters Patent is:

1. A nozzle comprising:
   an intake for initially receiving a fluid therein;
   a surface relating with said intake that receives fluid flow thereon;
   a discharge providing an exit for said fluid from said nozzle; and
   at least one dynamic fluid flow regulator featured and operable with said surface, said fluid flow regulator comprising:
   a leading edge,
   a trailing edge, and an orthogonal pressure recovery drop extending between said leading and trailing edges to form a down step, said pressure recovery drop comprising at least one drop face, and means for increasing the height of said drop face.

2. The nozzle of claim 1, wherein said fluid flow regulator is positioned to decrease the separation potential of said fluid.

3. The nozzle of claim 1, said fluid encounters and flows over said pressure recovery drop, producing a low pressure area of fluid molecules having decreased kinetic energy at said surface to facilitate laminar flow and assist in the reduction of the separation potential of said fluid.

4. An exhaust system comprising:
   an intake coupled to and initially receiving a fluid from a fluid generator;
   a surface relating with said intake that receives fluid flow thereon;
   a discharge providing an exit for said fluid from said exhaust system; and
   at least one fluid flow regulator featured and operable with said surface, said fluid flow regulator comprising a leading edge, a trailing edge, and an orthogonal pressure recovery drop extending between said leading and trailing edges to form a down step, said pressure recovery drop comprising at least one drop face of a calculated distance formed therein, said fluid flow regulator functioning to optimize air flow, reduce separation of said fluid over said surface relating with said intake of said exhaust system, and reduce induced noise.

5. The nozzle of claim 1, wherein said pressure recovery drop comprises a formation selected from the group consisting of linear, curved, spline, and any combination of these.

6. The nozzle of claim 1, wherein said fluid flow regulator comprises a pressure gradient regulator.

7. The nozzle of claim 1, wherein said pressure recovery drop extends entirely across said surface.

8. The nozzle of claim 1, wherein said pressure recovery drop extends across only a portion of said surface.

9. The nozzle of claim 1, wherein said surface comprises a plurality of fluid flow regulators that function together to regulate, influence, and control fluid flow and its properties and characteristics across said surface.

10. The nozzle of claim 1, wherein said fluid flow regulator is a dynamic fluid flow regulator capable of adjusting, on demand, with varying design constraints, flow characteristics, environmental conditions, and operational situations pertaining to said fluid, said device, and any combination of these during.

11. The nozzle of claim 10, wherein said dynamic fluid flow regulator comprises at least one selectively adjustable element, wherein said adjustable elements are selected from a movable leading edge, a movable pressure recovery drop, and a movable trailing edge, each capable of adjusting the height of said drop face and said pressure drop.

12. The nozzle of claim 1, wherein said fluid flow regulator comprises means for effectuating vector positioning about said surface.

13. The nozzle of claim 1, wherein said fluid flow regulator comprises at least one component that oscillates with varying situations and conditions to vary the height of said pressure recovery drop.

14. The nozzle of claim 1, wherein said leading edge is integrally formed with said surface.

15. The nozzle of claim 1, wherein said pressure recovery drop is integrally formed with said surface.

16. The nozzle of claim 1, wherein said trailing edge is integrally formed with said surface.

17. The nozzle of claim 1, wherein said leading edge, said pressure recovery drop, and said trailing edge of said fluid flow regulator are each embodied in a fluid flow regulator device that is removably attachable to an existing surface to allow said existing surface to comprise one or more fluid flow regulators.

18. The nozzle of claim 1, wherein said pressure recovery drop comprises a plurality of drop faces to magnify the influence of fluid flow regulator on said fluid.

19. The exhaust system of claim 18, wherein said plurality of drop faces each comprise a sub-atmospheric barrier.

20. The exhaust system of claim 1, wherein said pressure recovery drop is positioned at or proximate an optimal pressure recovery point defined as the location(s) about said surface at which there is an imbalanced or unequal pressure gradient forward and aft of said fluid, thus creating an adverse pressure within said device, which adverse pressure gradient induces friction and pressure drag that ultimately increases the separation potential of said fluid.

21. The exhaust system of claim 1, wherein said fluid is selected from the group consisting of gaseous fluids, liquid fluids, and any combination of these.

22. An exhaust system comprising:
   an intake coupled to and initially receiving a fluid from a fluid generator;
   a surface relating with said intake that receives fluid flow thereon;
   a discharge providing an exit for said fluid from said exhaust system; and
   at least one dynamic fluid flow regulator featured and operable with said surface, said fluid flow regulator comprising a leading edge, a trailing edge, and a an orthogonal pressure recovery drop extending between said leading and trailing edges to form a down step, said pressure recovery drop comprising at least one drop face of a calculated distance formed therein, and means for vertically positioning the height of said drop, said fluid flow regulator functioning to optimize air flow, reduce separation of said fluid over said surface relating with said intake of said exhaust system, and reduce induced noise.

23. The exhaust system of claim 22, wherein said pressure recovery drop is oriented in a position selected from the group consisting of perpendicular to the direction of flow of said fluid, substantially perpendicular to the direction of flow of said fluid, on an angle with respect to said direction of flow of said fluid, parallel or substantially parallel to the direction of flow of said fluid, and any combination of these.

24. The exhaust system of claim 22, wherein said pressure recovery drop comprises a formation selected from the group consisting of: linear, curved, spline, and any combination of these.

25. The exhaust system of claim 22, wherein said fluid flow regulator comprises a pressure gradient regulator.

26. The exhaust system of claim 22, wherein said pressure recovery drop extends entirely across said surface.

27. The exhaust system of claim 22, wherein said pressure recovery drop extends across only a portion of said surface.

28. The exhaust system of claim 22, wherein said surface comprises a plurality of fluid flow regulators that function together to regulate, influence, and control fluid flow and its properties and characteristics across said surface.

29. The exhaust system of claim 22, wherein said fluid flow regulator is a dynamic fluid flow regulator capable of adjusting, on demand, with varying design constraints, flow characteristics, environmental conditions, and operational situations pertaining to said fluid, said device, and any combination of these during.

30. The exhaust system of claim 29, wherein said dynamic fluid flow regulator comprises at least one selectively adjustable element, wherein said adjustable elements are selected from a movable leading edge, a movable pressure recovery drop, and a movable trailing edge, each capable of adjusting the height of said drop face and said pressure drop.

31. The exhaust system of claim 22, wherein said fluid flow regulator comprises means for effectuating vector positioning about said surface.

32. The exhaust system of claim 22, wherein said fluid flow regulator comprises at least one component that oscillates with varying situations and conditions to vary the height of said pressure recovery drop.

33. The exhaust system of claim 22, wherein said leading edge is integrally formed with said surface.

34. The exhaust system of claim 22, wherein said pressure recovery drop is integrally formed with said surface.

35. The exhaust system of claim 22, wherein said trailing edge is integrally formed with said surface.

36. The exhaust system of claim 22, wherein said leading edge, said pressure recovery drop, and said trailing edge of said fluid flow regulator are each embodied in a fluid flow regulator device that is removably attachable to an existing surface to allow said existing surface to comprise one or more fluid flow regulators.

37. The exhaust system of claim 22, wherein said pressure recovery drop comprises a plurality of drop faces to magnify the influence of fluid flow regulator on said fluid.

38. The exhaust system of claim 37, wherein said plurality of drop faces each comprise a sub-atmospheric barrier.

39. The exhaust system of claim 22, wherein said pressure recovery drop is positioned at or proximate an optimal pressure recovery point defined as the location(s) about said surface at which there is an imbalanced or unequal pressure gradient forward and aft of said fluid, thus creating an adverse pressure within said device, which adverse pressure gradient induces friction and pressure drag that ultimately increases the separation potential of said fluid.

40. The exhaust system of claim 22, wherein said fluid is selected from the group consisting of gaseous fluids, liquid fluids, and any combination of these.

41. A conduit comprising:
an conduit intake capable of receiving a fluid therein;
a surface relating with said conduit intake that receives fluid flow thereon;
a conduit discharge providing an exit for said fluid from said conduit; and
at least one dynamic fluid flow regulator featured and operable with said surface, said fluid flow regulator comprising a leading edge, a trailing edge, a pressure recovery drop extending between said leading and trailing edges to form a down step, and means for adjusting the height of said drop said pressure recovery drop comprising at least one drop face of a calculated distance formed therein, said fluid
flow regulator functioning to optimize air flow, reduce separation of said fluid over said first surface of said conduit, and reduce induced noise.

42. A method for influencing internal fluid flow and regulating pressure gradients within an internal flow device or system and for influencing the rate and magnitude of pressure recovery about a surface within said device, said method comprising the steps of: featuring at least one fluid flow regulator with one or more surfaces of an internal fluid flow device having at least one surface thereon, said fluid flow regulator comprising:
a pressure recovery drop having at least one drop face formed therein, said drop face comprising a calculated height;
subjecting said device to a fluid, such that said fluid is caused to move within said device;
causing said fluid to encounter said fluid flow regulator, such that said pressure recovery drop induces a sudden drop in pressure as said fluid flows over said fluid flow regulator, wherein a sub-atmospheric barrier is created at the base of said drop face, said fluid flow regulator functioning to optimize fluid flow within said device, thus increasing the performance of said device; and
dynamically adjusting the height of said recovery drop in response to variable fluid conditions.

43. The method of claim 42, wherein said step of featuring comprises the step of positioning said fluid flow regulator at an optimal pressure recovery point.

44. The method of claim 43, wherein said step of positioning said fluid flow regulator comprises positioning it in an orientation selected from the group consisting of perpendicular to the direction of flow of said fluid, substantially perpendicular to the direction of flow of said fluid, on an angle with respect to said direction of flow of said fluid, parallel or substantially parallel to the direction of flow of said fluid, and any combination of these.

45. The method of claim 43, further comprising the step of repositioning said fluid flow regulator as said optimal pressure recovery points change in response to varying conditions surrounding said fluid flow.

46. The method of claim 42, further comprising the step of varying said pressure recovery drop, and particularly said height of said drop face in response to changing conditions.

47. The method of claim 42, wherein said step of causing said fluid to encounter said fluid flow regulator has the effect of optimizing fluid flow and the performance of said object within said fluid, said fluid flow regulator:
regulating the pressure gradients that exist along said surface by reducing the pressure drag at various locations along said surface, as well as the pressure drag induced within forward and aft of said fluid in said device, via a pressure recovery drop;
increasing pressure recovery and pressure recovery potential as a result of regulating said pressure gradients and reducing said pressure drag;
reducing friction drag along said surface as a result of increasing said pressure recovery; and
decreasing fluid separation and fluid separation potential as a result of said reducing friction drag.

* * * * *